(12) United States Patent
Tanaka

(10) Patent No.: US 11,276,318 B2
(45) Date of Patent: Mar. 15, 2022

(54) ELECTRONIC APPARATUS, LEARNING SUPPORT TERMINAL, LEARNING SUPPORT METHOD, AND RECORDING MEDIUM

(71) Applicant: CASIO COMPUTER CO., LTD., Tokyo (JP)

(72) Inventor: Toshiaki Tanaka, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 324 days.

(21) Appl. No.: 16/355,609

(22) Filed: Mar. 15, 2019

(65) Prior Publication Data

US 2019/0295431 A1  Sep. 26, 2019

(30) Foreign Application Priority Data

Mar. 26, 2018 (JP) .............................. JP2018-057713
Mar. 12, 2019 (JP) .............................. JP2019-044893

(51) Int. Cl.
*G09B 7/00* (2006.01)
*G06F 15/02* (2006.01)
(Continued)

(52) U.S. Cl.
CPC ........... *G09B 7/00* (2013.01); *G06F 15/0283* (2013.01); *G06F 16/338* (2019.01);
(Continued)

(58) Field of Classification Search
CPC .............................. G09B 7/00; G06F 15/0283
(Continued)

(56) References Cited

U.S. PATENT DOCUMENTS 9,973,880 B2    5/2018  Tanaka
2006/0024649 A1*  2/2006  Vernon .................... G09B 7/02
                                                    434/201

(Continued)

FOREIGN PATENT DOCUMENTS

EP    3223262 A1    9/2017
JP    63103354 A    5/1988
(Continued)

OTHER PUBLICATIONS

Extended European Search Report (EESR) dated May 13, 2019 issued in counterpart European Application No. 19163473.2.

*Primary Examiner* — Thomas J Hong
(74) *Attorney, Agent, or Firm* — Holtz, Holtz & Volek PC

(57) ABSTRACT

An electronic apparatus includes a processor and a storage storing instructions that, when executed by the processor, control the processor to perform acquiring a command list, determining a position and/or a locus in a coordinate system set based on all of one or more commands of the acquired command list, determining first determination information indicating whether the determined position in the coordinate system matches with a specific position in the coordinate system and/or second determination information indicating whether the determined locus in the coordinate system intersects with a specific region in the coordinate system, determining whether the command list is correct, and outputting at least any of the determined first determination information, the determined second determination information, and correct/incorrect determination information indicating the determination result of whether the command list is correct.

7 Claims, 18 Drawing Sheets

(51) Int. Cl.
*G09B 7/04* (2006.01)
*G06F 16/38* (2019.01)
*G06F 16/338* (2019.01)
*H04W 4/70* (2018.01)

(52) U.S. Cl.
CPC ............ *G06F 16/381* (2019.01); *G09B 7/04* (2013.01); *H04W 4/70* (2018.02)

(58) Field of Classification Search
USPC ........................................................ 434/322
See application file for complete search history.

(56) References Cited

U.S. PATENT DOCUMENTS

| | | | |
|---|---|---|---|
| 2012/0330182 A1* | 12/2012 | Alberts | ................. G16H 40/67 600/558 |
| 2016/0085845 A1 | 3/2016 | Yoshizawa | |
| 2016/0086512 A1 | 3/2016 | Yoshizawa | |
| 2018/0220286 A1 | 8/2018 | Tanaka | |

FOREIGN PATENT DOCUMENTS

| JP | 2008027033 A | 2/2008 |
|---|---|---|
| JP | 2012137718 A | 7/2012 |
| JP | 6256315 B2 | 12/2017 |
| JP | 2017219718 A | 12/2017 |

\* cited by examiner

Move (30)
Turn (+90)
Move (60)

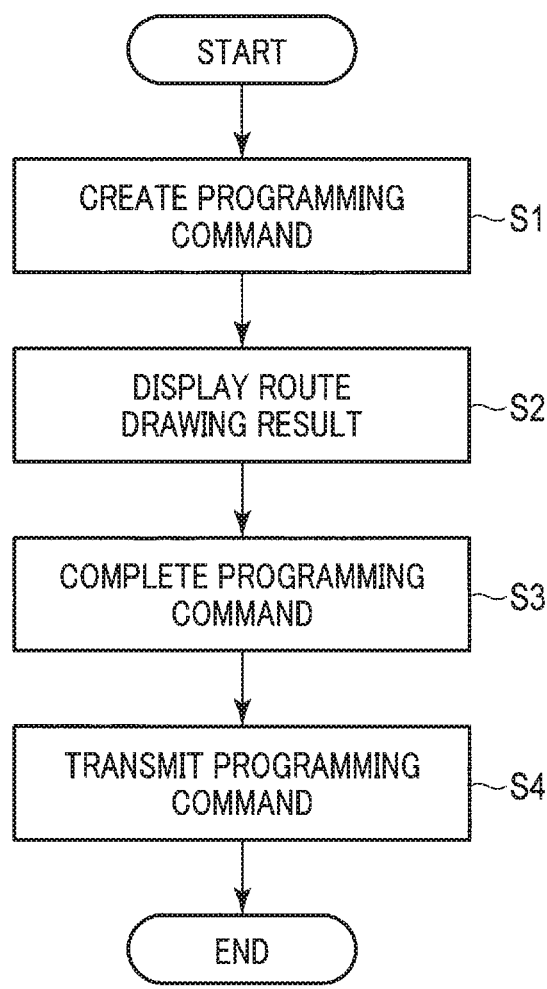
F I G. 18

ELECTRONIC APPARATUS, LEARNING SUPPORT TERMINAL, LEARNING SUPPORT METHOD, AND RECORDING MEDIUM

CROSS-REFERENCE TO RELATED APPLICATIONS

This application is based upon and claims priority to Japanese Patent Applications No. 2018-057713, filed on Mar. 26, 2018, and No. 2019-44893, filed on Mar. 12, 2019, the entire contents of which are incorporated herein by reference.

BACKGROUND

1. Technical Field

The technical field relates to an electronic apparatus, a learning support terminal, a learning support method, and a recording medium, which are capable of determining whether a programming command is correct or incorrect and outputting the determination result.

2. Description of Related Art

In prior art, graph function electronic calculators are electronic calculators capable of performing drawing of a graph, calculation of simultaneous equations, and arithmetic operations using a variable. Graph function electronic calculators of this type include a display, and are capable of displaying a text of a plurality of lines and a graph serving as a calculation result on a display.

As described above, because graph function electronic calculators include a display, it is considered to use them for programming education in recent years.

When graph function electronic calculators are supposed to be used for programming education, the use as, for example, equipment for performing algorithm learning may be considered as the application of graph function electronic calculators. In this application, it suffices that the graph function electronic calculators have a mode configured to be switchable from a calculation mode to execute calculation to a mode (hereinafter referred to as "algorithm mode") to learn algorithm.

In the algorithm mode, for example, a user who is a student can learn an algorithm by displaying an avatar such as a point on a display, further moving the avatar, and drawing a figure with a locus in response to a programming command (command list) input by the user (student) through the creation of, for example, a route drawing programming command for drawing a route from a point A to a point B, or, for example, a figure drawing programming command for drawing a designated figure such as an isosceles triangle.

Furthermore, a teacher can grasp the degree of understanding of each student by transmitting the created programming command to a teacher's electronic apparatus (terminal).

However, unlike a fill-in-the-blank question or a choice question, the programming command has many correct answers.

Therefore, in the algorithmic education, the teacher needs to not only shows correct and incorrect answers to students but also, even if the answer is correct, needs to explain to students from various viewpoints such as different ideas or more efficient programs. In addition, even the answer is incorrect, the teacher preferably explains how to reach the correct answer to students as individually and specifically as possible.

In order to enable the teacher to carry out these within a limited class time, it is preferable that the teacher's electronic apparatus not only receives the programming command transmitted from each student, but also has a support function that can reduce the burden on the teacher as much as possible. Therefore, in addition to classifying programming commands transmitted from each student into correct or incorrect answers, it is preferable that the teacher's electronic apparatus can perform classification in more detail in accordance with contents among the correct or incorrect answers.

SUMMARY

In one embodiment, an electronic apparatus is provided. The electronic apparatus includes a processor and a storage storing instructions that, when executed by the processor, control the processor to:
 acquire a command list including one or more commands, the command list created as an answer to a preset question;
 determine a position and/or a locus in a coordinate system set on a screen of a display based on all of the one or more commands of the acquired command list;
 determine first determination information indicating whether the determined position in the coordinate system matches with a specific position in the coordinate system determined according to the preset question and/or second determination information indicating whether the determined locus in the coordinate system intersects with a specific region in the coordinate system determined according to the preset question;
 determine whether the command list is correct as an answer to the preset question based on the determined first determination information and/or the determined second determination information; and
 output, from the display, at least any of the determined first determination information, the determined second determination information, and correct/incorrect determination information indicating the determination result of whether the command list is correct as the answer to the preset question.

In another embodiment, a learning support terminal is provided. The learning support terminal includes a processor and a storage storing instructions that, when executed by the processor, control the processor to:
 receive, from an input unit, an input of an command list including one or more commands, wherein the command list created as a correct answer to a preset question;
 generate a two-dimensional code including and information on the position in the determined coordinate system; and
 output the received information on the command list in a manner such that the received information is readable by an external electronic apparatus.

In another embodiment, a learning support method is provided. The learning support method performed by a learning support system includes a learning support terminal, an electronic apparatus, a two-dimensional code reader, and a server apparatus, the method includes:
 under control of a processor of the learning support terminal,
 receiving, from an input unit, an input of an command list including one or more commands, wherein the command list created as a correct answer to a preset question;

generating a two-dimensional code including at least information on the command list that has received the input; and outputting the generated two-dimensional code from a display that the two-dimensional code can be read by an external imaging apparatus;

under control of the two-dimensional code reader, decoding the two-dimensional code output from the display by causing an imaging apparatus to read; and transmitting, by a communication apparatus of the two-dimensional code reader, information on the decoded two-dimensional code, under control of a processor of the server apparatus, receiving by a communication apparatus of the server, information on the two-dimensional code transmitted by the communication apparatus of the two-dimensional code reader;

determining a position and/or a locus in a coordinate system set on a screen of a display in accordance with all of the one or more commands acquired by decoding the information on the received two-dimensional code;

determining whether the command list is a correct answer to a preset question based on first determination information indicating whether the position in the determined coordinate system matches with a specific position in the coordinate system determined according to the preset question and/or second determination information indicating whether the determined locus in the coordinate system intersects with a specific region in the coordinate system determined according to the preset question; and outputting, by the communication apparatus of the server apparatus, at least any of the first determination information, the second determination information, and correct/incorrect determination information indicating the determination result of whether the answer is the correct answer, and under control of a processor of the electronic apparatus, receiving, by a communication apparatus of the electronic apparatus, any of the information; and outputting any of the information from a display.

In another embodiment, a non-transitory recording medium is provided. The non-transitory recording medium has a program recorded thereon that is executable to control a processor of an electronic apparatus to perform, wherein the electronic apparatus includes a processor and a storage storing instructions to be executed by the processor:

acquiring an command list including one or more commands, wherein the command list created as a correct answer to a preset question;

determining a position and/or a locus in a coordinate system set on a screen of a display in accordance with all of the one or more commands of the acquired command list;

determining first determination information indicating whether the position in the determined coordinate system matches with a specific position in the coordinate system determined according to a preset question and/or second determination information indicating whether the determined locus in the coordinate system intersects with a specific region in the coordinate system determined according to the preset question;

determining whether the command list is a correct answer to the preset question based on the determined first determination information and/or the determined second determination information; and outputting, from the display, at least any of the first determination information, the second determination information, and correct/incorrect determination information indicating the determination result of whether the answer is the correct answer.

In another embodiment, a non-transitory recording medium is provided. The non-transitory recording medium has a program recorded thereon that is executable to control a processor of a learning support terminal to perform, wherein the terminal includes a processor and a storage storing instructions to be executed by the processor:

receiving, from an input unit, an input of an command list including one or more commands, wherein the command list created as a correct answer to a preset question;

determining a position in a coordinate system set on a screen of a display in accordance with all of the one or more commands included in the command list that has received the input;

generating a two-dimensional code including information on the command list that has received the input and information on the position in the determined coordinate system; and outputting the generated two-dimensional code from a display so as to be readable by an external imaging apparatus.

BRIEF DESCRIPTION OF THE DRAWINGS

The components in the drawings are not necessarily to scale relative to each other.

FIG. 18 is a flowchart illustrating an operation example on the graph function electronic calculator side;

DETAILED DESCRIPTION

Hereinafter, an electronic apparatus to which a classification method according to an embodiment of the present invention is applied will be described with reference to the drawings.

Figure 1:
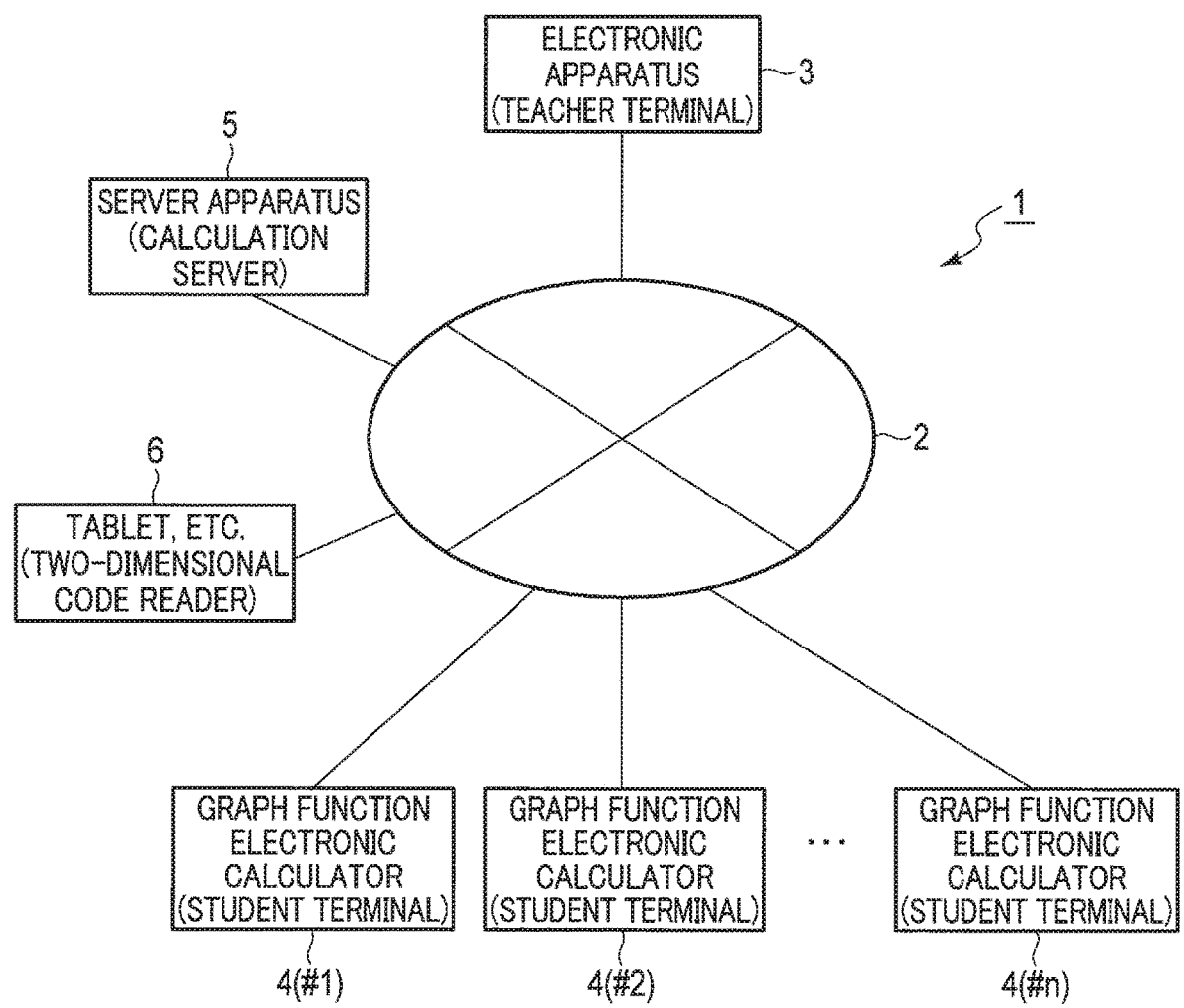
FIG. 1 is a conceptual diagram illustrating an example of a network configuration to which an electronic apparatus is applied, a classification method according to an embodiment of the present invention being applied to the electronic apparatus.

FIG. 1 is a conceptual diagram illustrating an example of a network configuration 1 to which an electronic apparatus 3 is applied, a classification method according to an embodiment of the present invention being applied to the electronic apparatus 3.

That is, the electronic apparatus 3, which is an example of a teacher terminal used by a teacher, is connected to a communication network 2 such as the Internet. In addition, a plurality of student terminals (external apparatuses) such as graph function electronic calculators 4 (#1 to #n) are also connected to the communication network 2. Therefore, the electronic apparatus 3 of the teacher and the graph function electronic calculators 4 (#1 to #n) of the plurality of students can communicate with each other via the communication network 2. "n" is a natural number.

In addition, the student terminals are not limited to being configured as the graph function electronic calculators 4, and can be configured as a tablet terminal, a personal computer, a smartphone, a mobile phone, a touch panel type PDA (personal digital assistants), an electronic book, a portable game machine, or the like.

Figure 2:
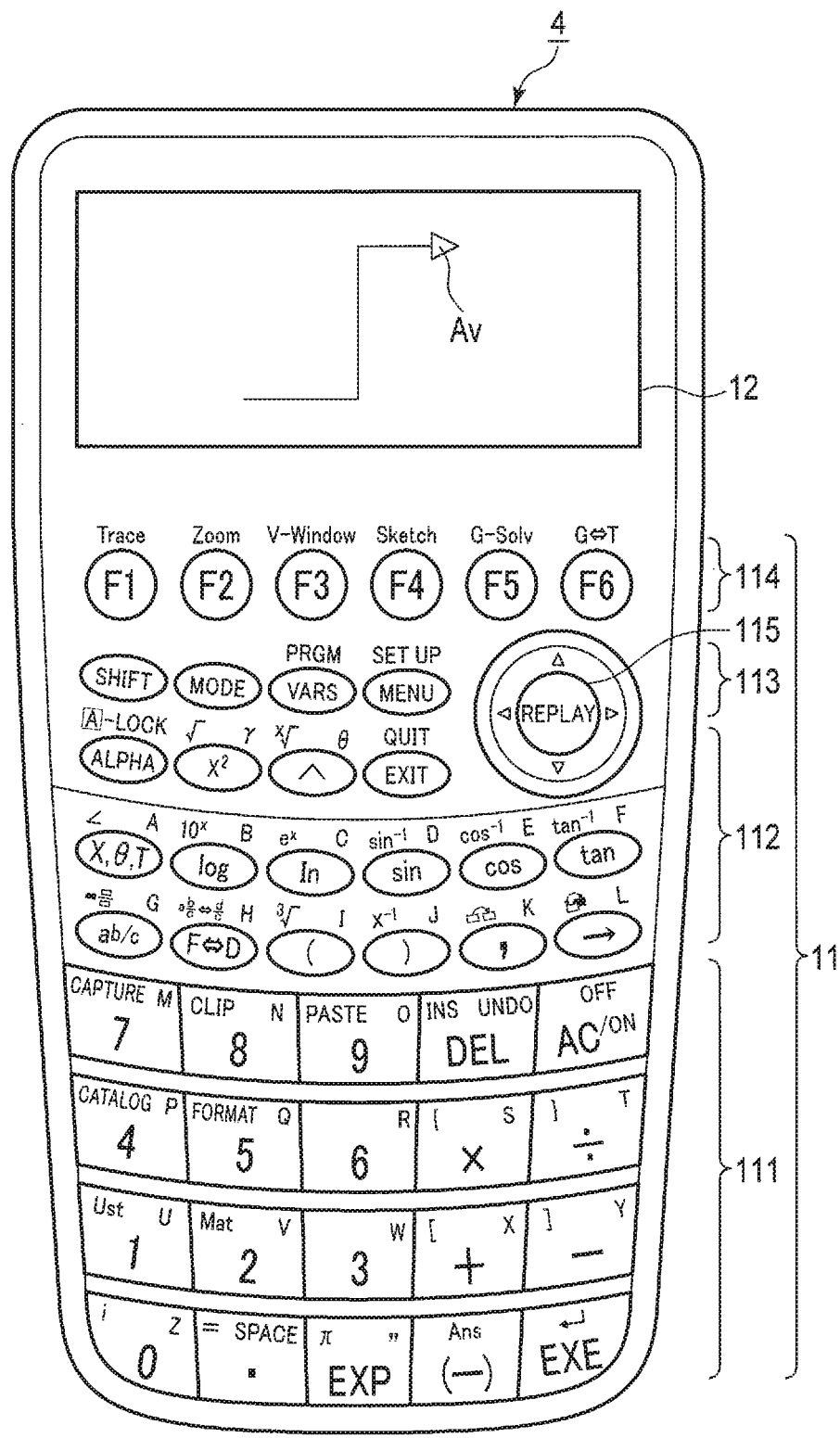
FIG. 2 is a front view illustrating an appearance configuration of a graph function electronic calculator.

FIG. 2 is a front view illustrating an appearance configuration of the graph function electronic calculator 4.

The graph function electronic calculator 4 has a small size enough to enable a user such as a student to hold and operate the graph function electronic calculator 4 by one hand for the necessity of its portability. The front surface of the main member of the graph function electronic calculator 4 is provided with a key input unit 11 and a display 12.

When an electronic apparatus, such as a tablet terminal, which is not provided with physical keys (buttons) is applied as the student terminal, the electronic calculator displays a software keyboard similar to keys of a graph function electronic calculator and executes processing in accordance with key operations on the software keyboard.

The key input unit 11 is provided with numerical value/arithmetic operation symbol keys 111 to input numerical values, numerical expressions, and program commands and command calculation and/or execution of a program, functional function keys 112 to input various functions and start a memory function, setting keys 113 including a mode selection key "MODE" to display menu pictures of various operation modes, such as a calculation mode and an algorithm mode, and command setting of these operation modes, function keys 114 to start various functions displayed along the lower end of the display 12 by one key operation, and a cursor key 115 to perform an operation of moving the cursor displayed on the display 12 and/or an operation of selecting an data item.

Keys arranged as the numerical value/arithmetic operation symbol keys 111 include keys [0] to [9](numerical values), keys [+], [−], [×], and [÷] (the four arithmetic operation symbols), a key [EXE] (execution), and a key [AC] (clear), and the like.

Keys arranged as the functional function keys 112 include a key [sin] (sine), a key [cos] (cosine), and a key [tan] (tangent), and the like.

Keys arranged as the setting keys 113 include a key [MENU] (menu), and a key [SHIFT] (shift), as well as the mode selection key [MODE].

Keys [F1] to [F6] are arranged as the function keys 114.

The keys of the numerical value/arithmetic operation symbol keys 111, the functional function keys 112, the setting keys 113, and the function keys 114 are configured to function as keys of functions described above the keys, not the key functions described on the key tops, by being operated successively after the key [SHIFT] is operated. For example, when the key [AC] is operated after the key [SHIFT] is operated (hereinafter referred to as "keys [SHIFT]+[AC]"), the key function as the key [OFF] (power off). The keys [SHIFT]+[MENU] function as the key [SET UP](set up), and the keys [SHIFT]+[F3] function as the key [V-Window] (view window: commanding display of a drawing region setting picture).

The display 12 is formed of a liquid crystal display unit of a dot-matrix type. When the graph function electronic calculator 4 is a tablet terminal, the display 12 is formed of a liquid crystal display unit on which a touch panel is superimposed.

Figures 3, 4:
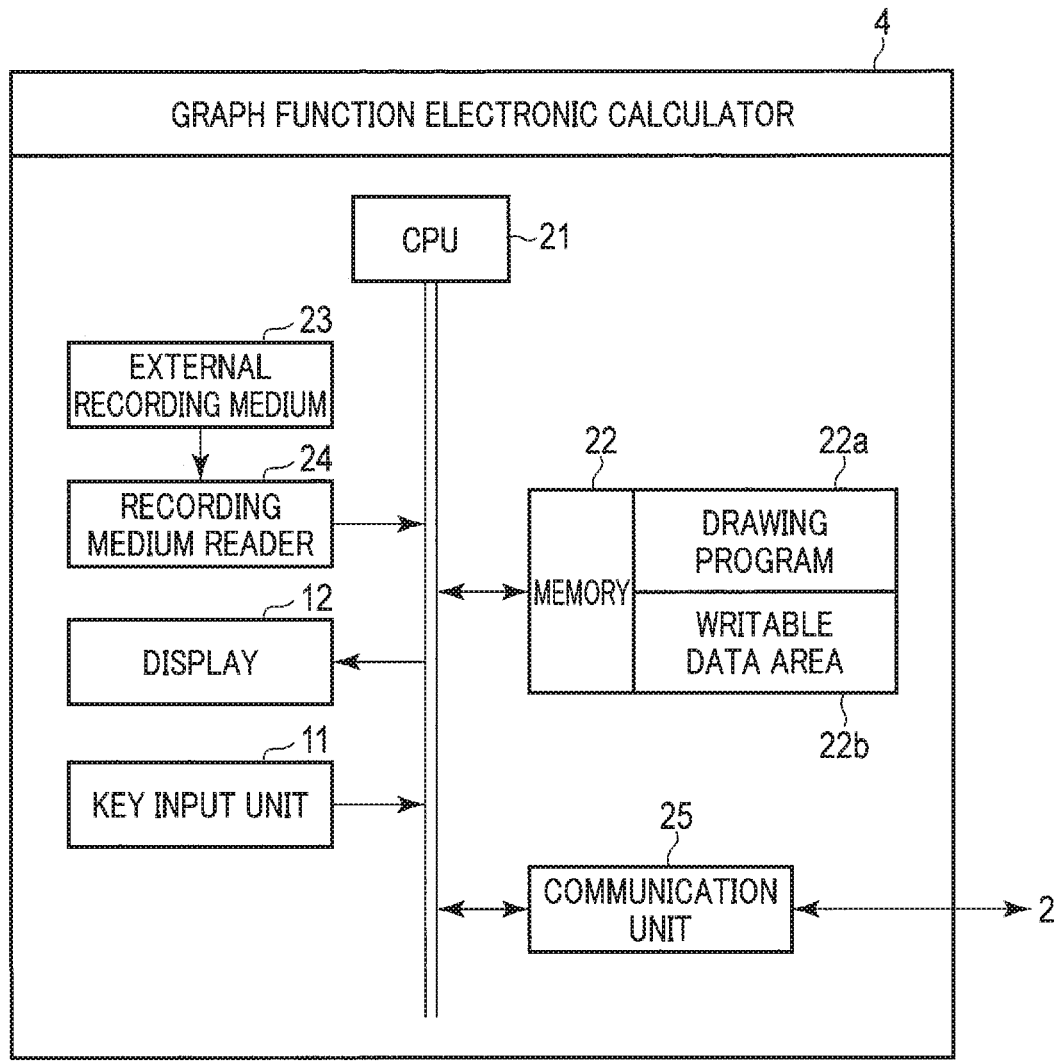
FIG. 3 is a block diagram illustrating a configuration example of an electronic circuit of a graph function electronic calculator.
FIG. 4 illustrates an example of a route drawing programming command.

FIG. 3 is a block diagram illustrating a configuration example of an electronic circuit of the graph function electronic calculator 4.

The electronic circuit of the graph function electronic calculator 4 includes a CPU 21 serving as a computer, a memory 22, a recording medium reader 24, and a communication unit 25, in addition to the key input unit 11 and the display 12.

The CPU 21 controls operations of each of units of the circuit in accordance with a drawing program 22a stored in the memory 22, and executes various types of processing corresponding to key input signals transmitted from the key input unit 11. The drawing program 22a may be stored in the memory 22 in advance, or read into the memory 22 from an external recording medium 23, such as a memory card, through the recording medium reader 24 and stored in the memory 22. The drawing program 22a is configured to be non-rewritable by a user's (student's) operation of the key input unit 11.

The memory 22 includes a writable data area 22b secured therein, as an area to store rewritable data by the user (student). The writable data area 22b serves as an area to which pieces of data of key codes input by key operations with the key input unit 11 are successively input to store data of numerical expressions, table data, and graph data and the like formed of the input data.

In the graph function electronic calculator 4 configured as described above, the CPU 21 controls operations of each of units of the circuit in accordance with the command described in the drawing program 22a, and the software and the hardware operate in cooperation to achieve a drawing function as explained below.

That is, the drawing program 22a includes figure drawing programming that, in the algorithm mode, displays an avatar (display body) Av such as a point from the display 12, further moves the avatar Av, and draws a figure with a locus in response to a programming command input through the key input unit 11, or, for example, a figure drawing programming that draws a figure such as an isosceles triangle.

The graph function electronic calculator 4 is set to the algorithm mode by pressing a "MODE" key in the setting keys 113. That is, the graph function electronic calculator 4 includes various operation modes, such as the calculation mode and the algorithm mode, and the calculation mode and the algorithm mode are alternately switched when the "MODE" key is pressed. The graph function electronic calculator 4 may include a mode other than the modes described above. Even when the graph function electronic calculator 4 includes three or more modes, the structure can be achieved by configuring the modes successively switchable each time the "MODE" key is pressed.

When the mode is set to the algorithm mode, the drawing program 22a comes to the state that can receive, from the numerical value/arithmetic operation symbol keys 111, a programming command for moving the display position of the avatar Av displayed on the display 12 by a certain movement amount and rotating the avatar Av by an angle.

In response to it, the user (student) is enabled to input the programming commands by operating the numerical value/arithmetic operation symbol keys 111.

FIG. 4 illustrates an example of a route drawing programming command. A user can create a programming command including one or more commands by inputting one command (command) for each row from the key input unit 11. In the present embodiment, the CPU 31 executes the programming command to determine "coordinates" and "direction" in the coordinate system set on the screen of the display 12, control the display 12 according to the determined "coordinates" and "direction", and display the avatar Av on the screen. The absolute angle of the "direction" is such that the positive direction parallel to the X axis is 0° and the counterclockwise direction is the positive direction. As each initial value of the "coordinates" and the "direction", the origin O and 0° are set in advance.

Figure 5:
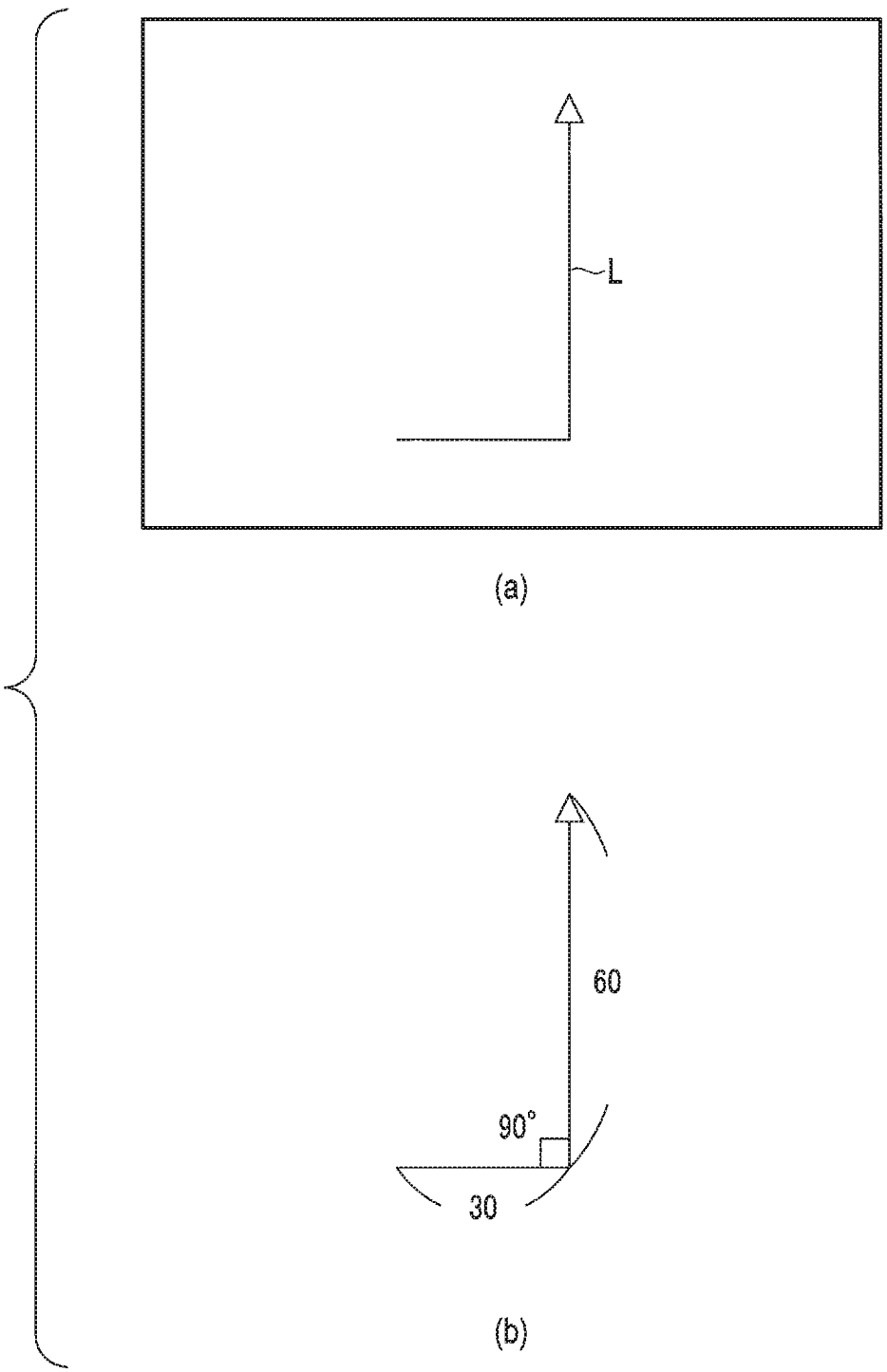
FIG. 5 is a diagram illustrating a correspondence between a drawing result displayed by execution of the route drawing programming command illustrated in FIG. 4 and a route drawing programming command of the drawing result.

FIG. 5A is a diagram illustrating the drawing result (locus) displayed on the screen of the display 12 by execution of the route drawing programming command illustrated in FIG. 4. The hollow triangle in FIG. 5A is the avatar Av, and one vertex of the triangle indicates the direction (right direction) of the avatar Av.

Here, each programming command may include the following commands. The movement-based command includes "Move" and "Go to". "Move (length)" is an command to move the avatar Av by the length designated by the argument along the direction of the avatar Av at the time of execution. "Go to (X coordinate, Y coordinate)" is an command to move the avatar Av to the coordinates designated by the argument, regardless of the direction of the avatar Av at the time of execution.

The rotation-based command includes "Turn" and "Direction". "Turn (relative angle)" is an command to change the direction of the avatar Av by the relative angle designated by the argument with reference to the direction of the avatar Av at the time of execution while maintaining the coordinates of the avatar Av at the time of execution. "Direction (absolute angle)" is an command to change the direction of the avatar Av to the direction of the absolute angle designated by the argument while maintaining the coordinates of the avatar Av at the time of execution. Although explanation is omitted herein, commands other than the above commands may be included in the programming command.

FIG. 5B is a diagram illustrating the correspondence between the drawing result illustrated in FIG. 5A and the route drawing programming command.

In accordance with the command "Move (30)" in the first line of the route drawing programming command illustrated in FIG. 4, the avatar Av is moved by "30" to the right in the drawing and its movement locus is drawn in the coordinate system. Next, in accordance with the command "Turn (+90)" in the second line, the direction of the avatar Av is rotated by "90°" in the upward direction in the drawing. Finally, in accordance with the command "Move (60)" in the third line, the avatar Av is moved by "60" in the upward direction in the drawing and the movement locus is drawn in the coordinate system. As described above, in accordance with the route drawing programming command illustrated in FIG. 4, the drawing result of FIG. 5A is obtained.

The communication unit 25 transmits the programming command input by the user (student) as illustrated in FIG. 4 and the coordinates (the coordinates of the arrival point C) at the time of executing all the commands included in the programming command to the electronic apparatus 3 via the communication network 2.

Figure 6:
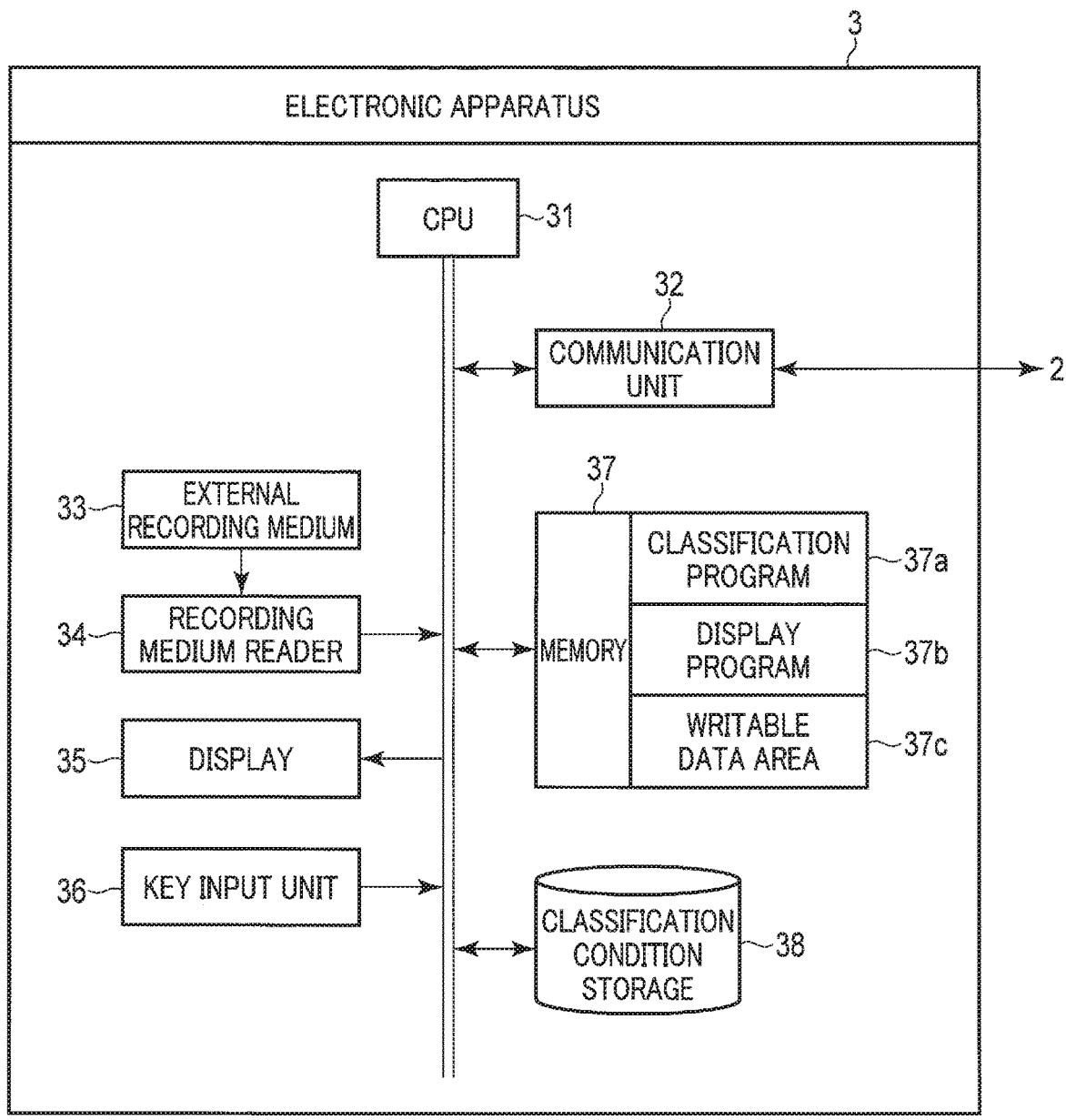
FIG. 6 is a block diagram illustrating a configuration example of an electronic circuit of an electronic apparatus.

FIG. 6 is a block diagram illustrating the configuration example of the electronic circuit of the electronic apparatus 3 used by the teacher.

The electronic apparatus 3 includes a CPU 31 serving as a computer, a communication unit 32, a recording medium reader 34, a display 35, a key input unit 36, a memory 37, and a classification condition storage 38.

Although the built-in key input unit 36 is illustrated in FIG. 6, the function for key input is not necessarily limited to the built-in key input unit 36, and it can also be realized by using an external keyboard (not illustrated). In this case, the electronic apparatus 3 includes an external interface (not illustrated) instead of the key input unit 36, and connects the external keyboard to the external interface.

The electronic apparatus 3 can be configured by, for example, a tablet terminal, a personal computer, a smartphone, a mobile phone, a touch panel type PDA (personal digital assistants), an electronic book, a portable game machine, or the like.

The communication unit 32 can communicate with a plurality of graph function electronic calculators 4 via the communication network 2, and can receive, via the communication network 2, the programming command proxy-transmitted by the smartphone or the tablet that has read a QR code transmitted from each graph function electronic calculator 4 or generated by the graph function electronic calculator 4.

The CPU 31 controls operations of each of units of the circuit in accordance with a classification program 37a and a display program 37b stored in the memory 37.

The classification program 37a and the display program 37b may be stored in the memory 37 in advance, or read into the memory 37 from an external recording medium 33, such as a memory card, through the recording medium reader 34 and stored in the memory 37. The classification program 37a and the display program 37b are configured to be non-rewritable by a user's (teacher's) operation of the key input unit 36.

In addition to such user non-rewritable information, for example, results or intermediate data, or the like generated by the classification program 37*a* or the display program 37*b* is stored in the memory 37. A writable data area 37*c* serving as a rewritable area is secured.

The classification condition storage 38 stores a classification condition for classifying each programming command received by the communication unit 32. This classification condition is set in advance by the teacher, stored in the classification condition storage 38, and used for classifying the programming commands by the classification program 37*a*.

In the electronic apparatus 3 configured as described above, the CPU 31 controls operations of each of units of the circuit in accordance with the commands described in the classification program 37*a* and the display program 37*b*, and the software and the hardware operate in cooperation to achieve a classification function and a display function as explained below.

The classification program 37*a* classifies each programming command received by the communication unit 32, based on the classification condition stored in the classification condition storage 38, by controlling operations of each of units of the circuit.

An example of the classification condition will be described below.

Figure 7:
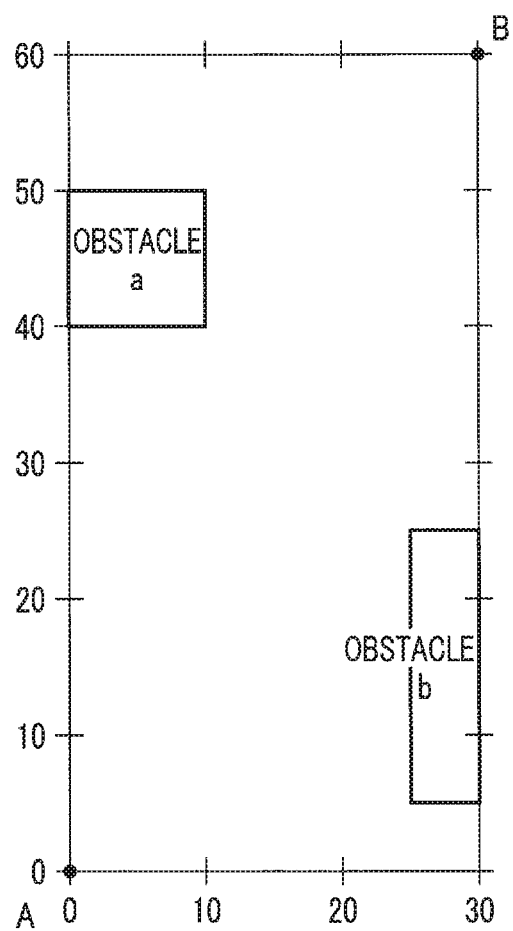
FIG. 7 is a two-dimensional plan view illustrating an example of map information considered in route drawing programming.

FIG. 7 is a two-dimensional plan view illustrating an example of map information (one preset question) considered in route drawing programming. A point A is an origin O (0, 0) of the coordinate system set on the screen of the display 12, and a point B is a coordinate point (30, 60) in the same coordinate system. An obstacle a is a rectangular region (boundary and its internal region) surrounded by four coordinate points (0, 40), (10, 40), (10, 50), and (0, 50), and an obstacle b is a rectangular region (boundary and its internal region) surrounded by four coordinate points (25, 5), (30, 5), (30, 25), and (25, 25). The coordinate values indicating the positions of the point B and the obstacles a and b are at least one correct answer determined with respect to the map information.

The students may use the individually operated graph function electronic calculators 4 (#1 to #n) to create programming commands for route drawing for moving the avatar Av while avoiding the obstacle a and the obstacle b from the point A to the point B as the answer to the map information illustrated in FIG. 7, that is, without passing through the regions (specific regions) respectively regarded as the obstacles a and b.

Figure 8:
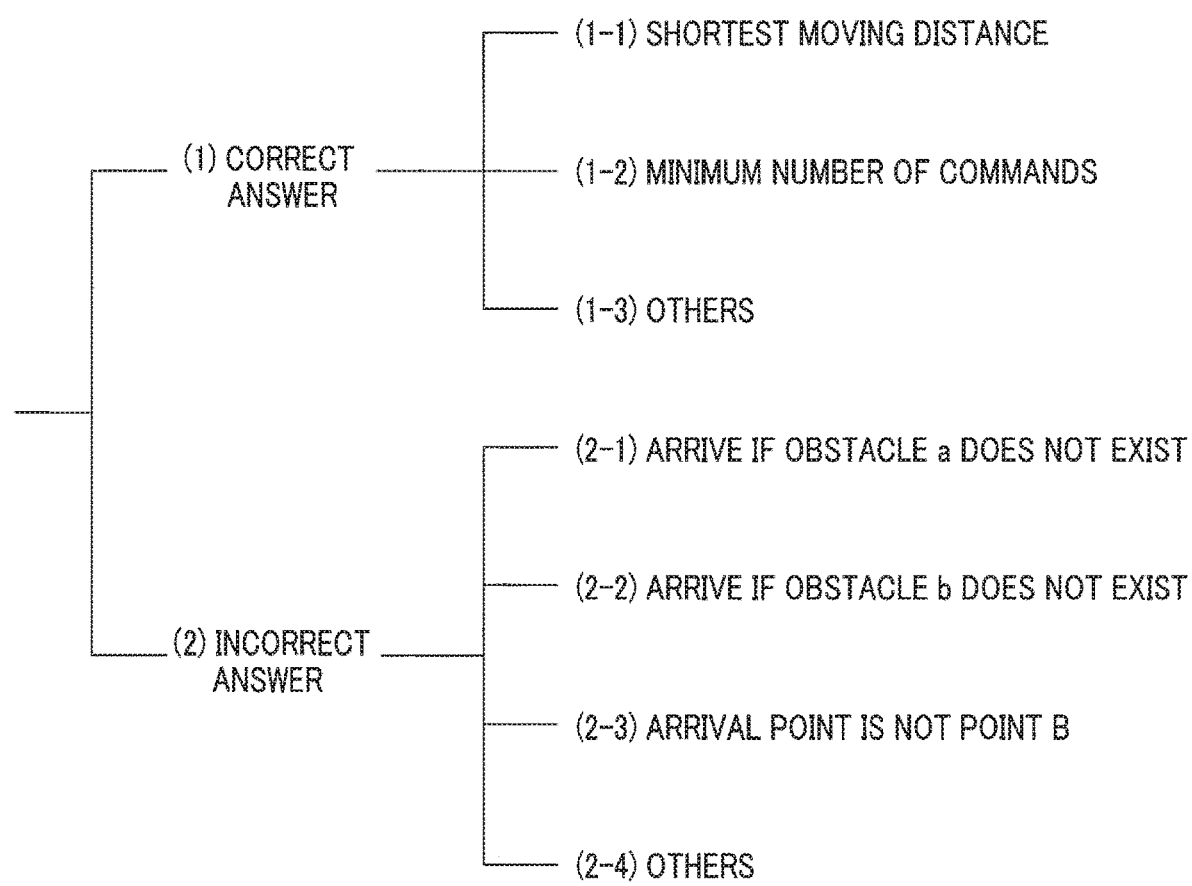
FIG. 8 is a classification system diagram illustrating an example of a classification condition.

In this case, as illustrated in FIG. 8, (1) the programming command that enables the avatar Av to arrive at the point B from the point A in the coordinate system without interrupting any of the obstacles a and b, that is, without passing through the regions specifying the obstacles a and b can be classified as the "correct answer", and (2) otherwise, that is, the programming command that cannot enable the avatar Av to arrive at the point B from the point A in the coordinate system or enables the avatar Av to pass through the regions specifying the obstacles a and b within the coordinate system can be classified as the "incorrect answer".

As will be described later, the electronic apparatus 3 acquires the plurality of programming commands output from the plurality of graph function electronic calculators 4 (#1 to #n). (1) When there is at least one programming command classified as the "correct answer", as illustrated in FIG. 8, among the at least one programming command, (1-1) that the avatar Av can arrive at the point B from the point A at the shortest moving distance can be subdivided as the "shortest moving distance", (1-2) that the avatar Av can arrive at the point B from the point A by the smallest number of commands can be subdivided as the "minimum number of commands", and (1-3) those that do not meet the two above conditions can be classified as "others".

In addition, the programming command classified as the (2) "incorrect answers" can be subdivided as follows. That is, as illustrated in FIG. 8, (2-1) although the avatar Av can arrive at the point B from the point A, the avatar Av passes through the region that specifies the obstacle a ("when the obstacle a does not exist, it arrives"), (2-2) although the avatar Av can arrive at the point B from the point A, the avatar Av passes through the region that specifies the obstacle b ("If the obstacle b does not exist, it arrives"), (2-3) although the avatar Av does not pass through the region that specifies the obstacles a and b, the avatar Av cannot arrive at the point B from the point A ("the arrival point is not the point B"), (2-4) those that do not meet the three above conditions can be subdivided as "others".

Figure 9:
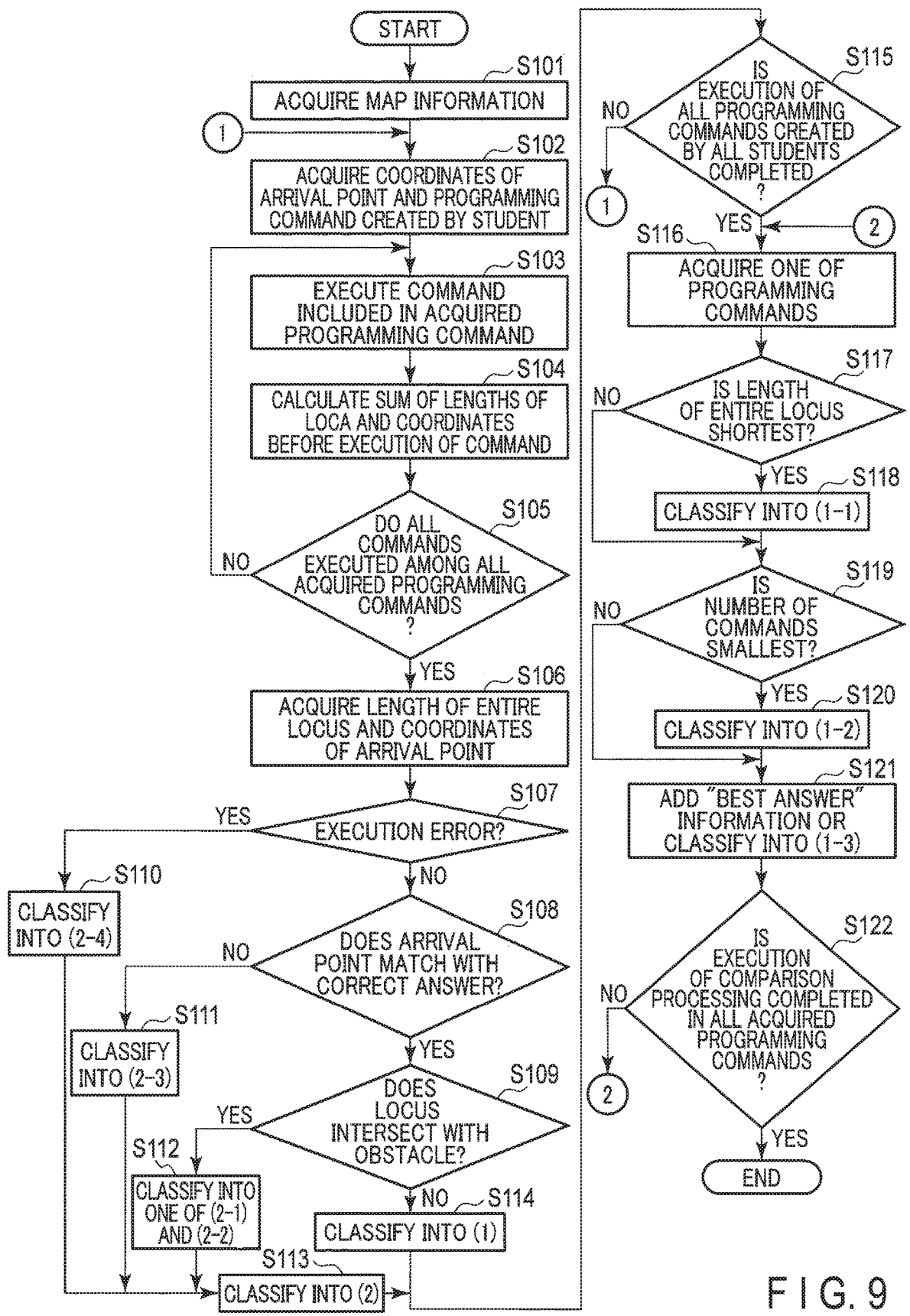
FIG. 9 is a flowchart illustrating a classification processing method based on a classification program.
Figure 10:
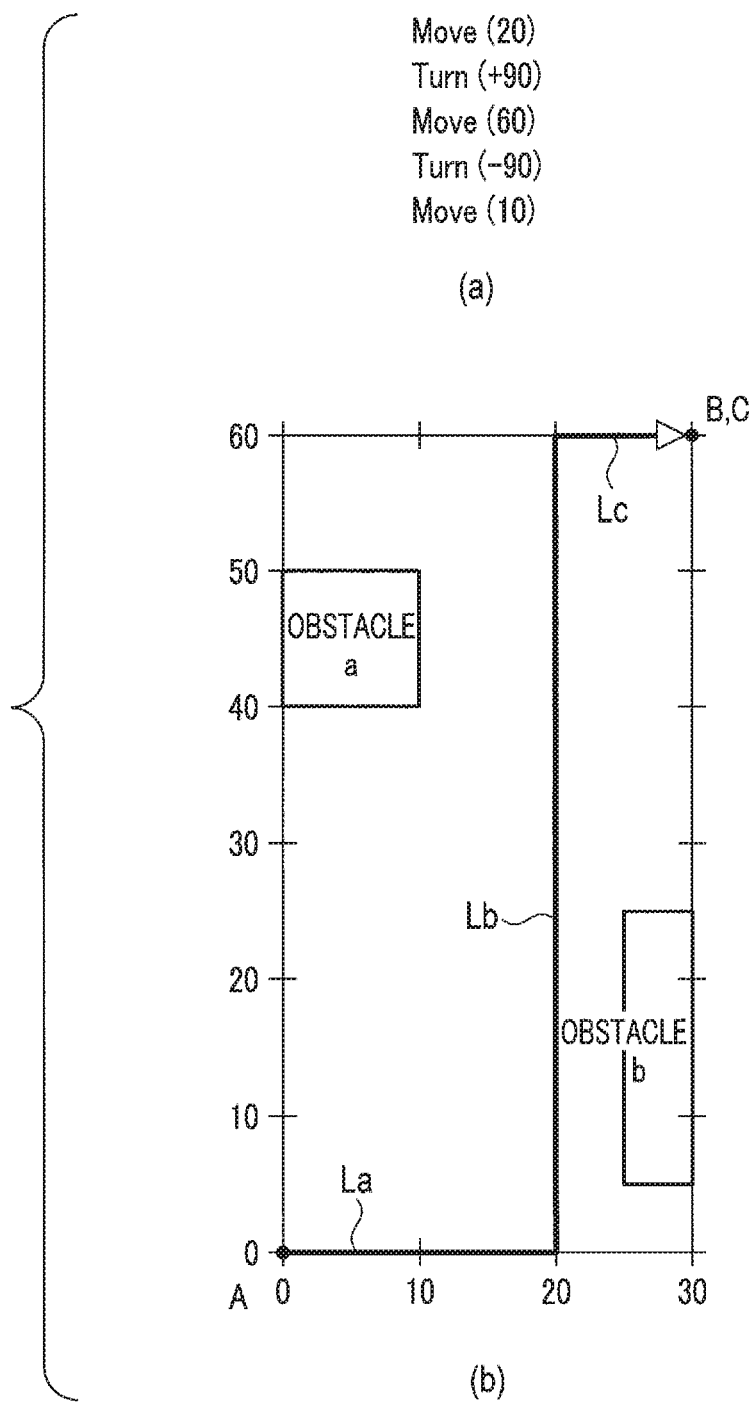
FIG. 10 is a diagram illustrating an example of programming commands and a route drawn by execution thereof (example of a correct answer)
Figure 11:
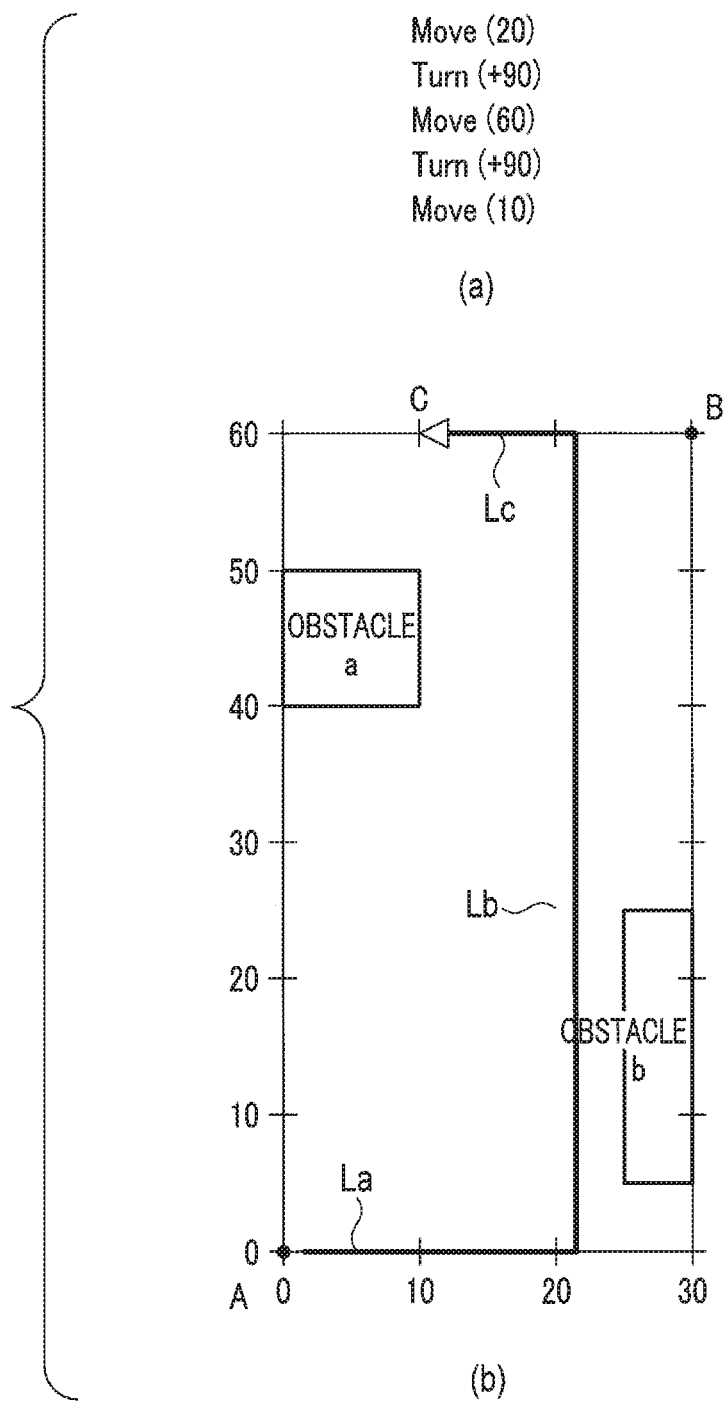
FIG. 11 is a diagram illustrating an example of programming commands and a route drawn by execution thereof (example of an incorrect answer)
Figure 12:
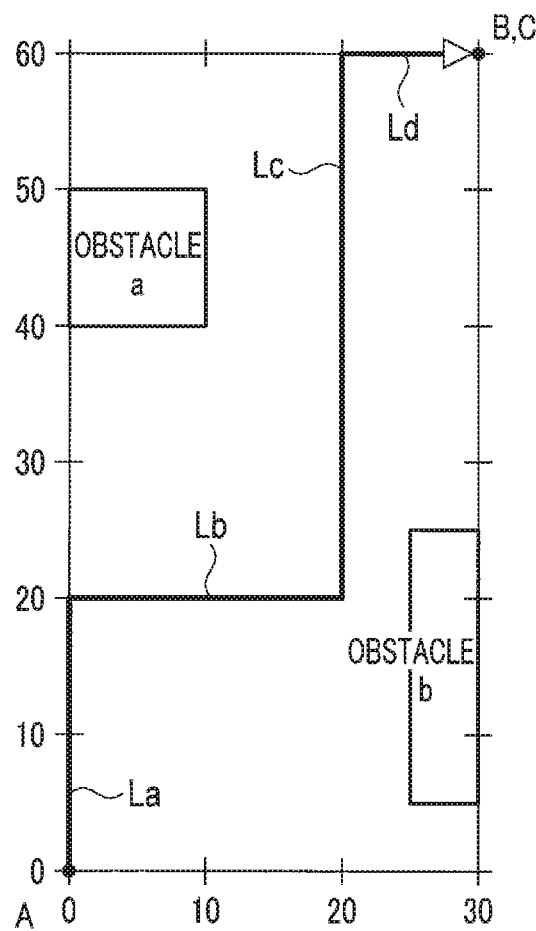
FIG. 12 is a diagram illustrating an example of programming commands and a route drawn by execution thereof (example of a correct answer)
Figure 13:
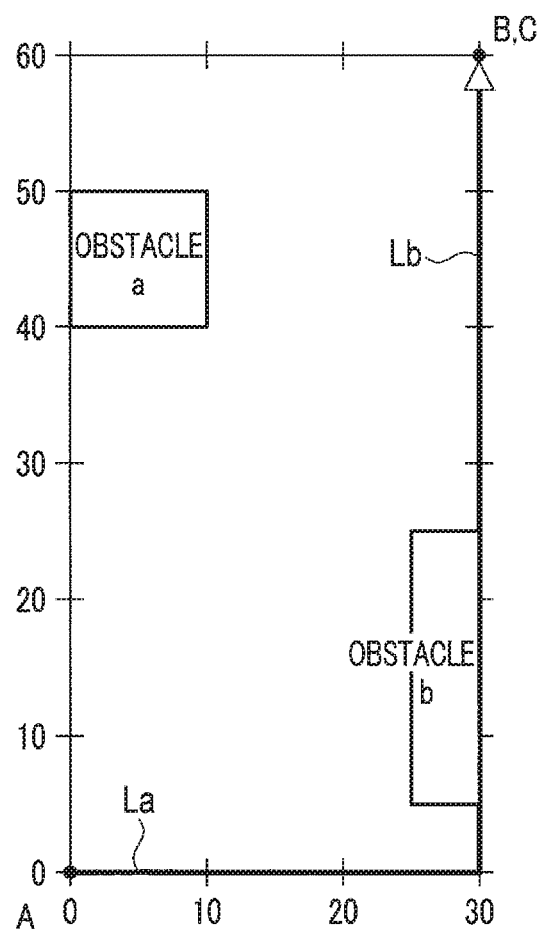
FIG. 13 is a diagram illustrating an example of programming commands and a route drawn by execution thereof (example of an incorrect answer)
Figure 14:
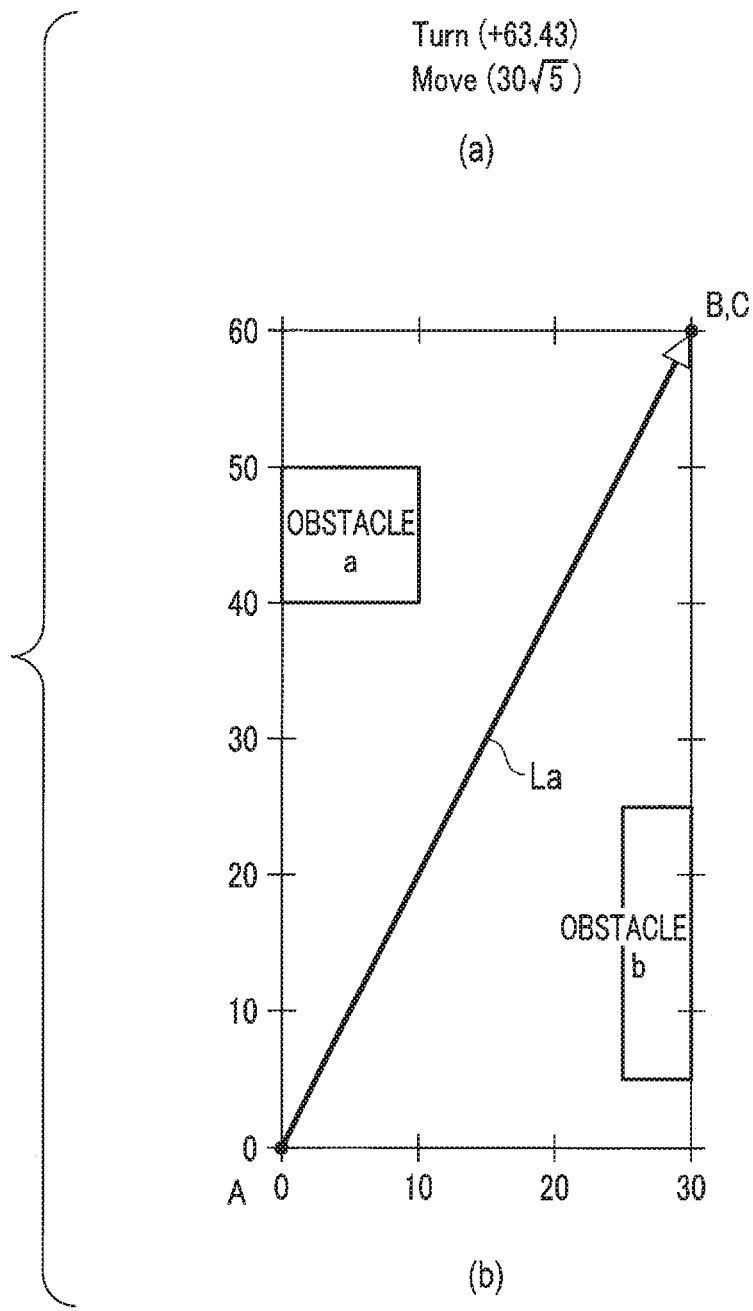
FIG. 14 is a diagram illustrating an example of programming commands and a route drawn by execution thereof (example of a correct answer)

The CPU 31 of the electronic apparatus 3 acquires the plurality of programming commands created by using the plurality of graph function electronic calculators 4 (#1 to #n) through the communication unit 32 or the recording medium reader 34 on which the external recording medium 33 is mounted. Hereinafter, a method of classifying the plurality of acquired programming commands in accordance with the classification program 37*a* by the CPU 31 will be described with reference to FIGS. 10 to 14. First, the processing when one or more commands included in each programming command is executed will be described with reference to FIG. 8, FIG. 9, and FIG. 10. In FIGS. 11 to 14, when the same processing as in FIG. 10 is performed, the description thereof will be omitted as appropriate.

The CPU 31 acquires the above-described map information, that is, the information on the coordinate values indicating the positions of the points A and B and the obstacles a and b (step S101). The map information may be input by operating the key input unit 36 of the electronic apparatus 3, may be input from the outside of the communication network 2 or the like via the communication unit 32, or may be fetched from the external recording medium 33 via the recording medium reader 34.

The CPU 31 acquires a plurality of programming commands and a plurality of arrival points C transmitted from a plurality of graph function electronic calculators 4 (step S102). The CPU 31 sequentially executes all the commands included in each of the plurality of acquired programming commands (step S103), calculates the sum of the length of the locus and the coordinates of the avatar Av after execution of each command each time an command is executed, and stores it in the writable data area 37*c* of the memory 37 (step S104).

In step S104, when the above-described movement-based command ("Move" or "Go to") is executed, the CPU 31 calculates the coordinates of the movement destination (the coordinates immediately after the movement-based command is executed), and stores the calculated coordinate value of the movement destination in the writable data area 37*c* of the memory 37. A line segment connecting the coordinates of the movement source in the coordinate system (the coordinate immediately before the movement-based command is executed) and the coordinates of the movement destination is at least a part of the locus of the avatar Av. The CPU 31 calculates the length of the line segment, adds the calculated length to the sum of the lengths of the line segments stored in the writable data area 37*c* of the memory 37, and overwrites the added value in the same memory area. When an command other than the above-described movement-based command is executed, it may be unnecessary to update each value stored in the writable data area 37c of the memory 37 since the sum of the length of the locus and the coordinates of the avatar Av do not change. As described above, after each command is executed, the sum of the lengths of the loca and the coordinate value of the arrival point at that time is stored in the writable data area 37c of the memory 37.

Specifically, in the above-described programming command illustrated in FIG. 10A, in accordance with the command "Move (20)" in the first line, the line segment connecting the origin O (0, 0) serving as the start point and the coordinate point (20, 0) are at least a part of the locus of the avatar Av obtained in accordance with the programming command (the first locus La in FIG. 10B). As information specifying this line segment, the CPU 31 calculates the numerical expression "y=0" and the numerical range "0≤x≤20" and calculates the length "20" of the line segment. Furthermore, the CPU 31 calculates the sum "20" of the lengths of the locus by adding the length "20" of the line segment calculated this time to the value (the initial value of the sum of the lengths of the line segments) "0" stored in the writable data area 37c of the memory 37 at that time, and overwrites and stores the calculated sum in the writable data area 37c of the memory 37. In addition, the CPU 31 adds "1" to the number of commands (third determination information) (initial value "0") included in the programming command and stores the added value in the writable data area 37c of the memory 37.

In accordance with the command "Turn (+90)" in the second line, the direction of the avatar Av is directed upward. Since the coordinates of the avatar Av do not change, the sum of the lengths of the line segments and the coordinate values stored in the writable data area 37c of the memory 37 at that time is retained. The CPU 31 overwrites and stores "2" in the writable data area 37c of the memory 37 as the numerical value indicating the number of commands included in the programming command.

In accordance with the command "Move (60)" in the third line, a line segment connecting two coordinate points (20, 0) and (20, 60) is at least another part (second locus Lb in FIG. 10B) of the locus of the avatar Av obtained in accordance with the programming command. As information specifying this line segment, the CPU 31 calculates the numerical expression "x=20" and the numerical range "0≤y≤60" and calculates the length "60" of the line segment. Furthermore, the CPU 31 calculates the sum "80" of the lengths of the locus by adding the length "60" of the line segment calculated this time to the value "20" stored in the writable data area 37c of the memory 37 at that time, and overwrites and stores the calculated sum in the writable data area 37c of the memory 37. In addition, the CPU 31 overwrites and stores "3" in the writable data area 37c of the memory 37 as the numerical value indicating the number of commands included in the programming command.

In accordance with the command "Turn (−90)" in the fourth line, the direction of the avatar Av is directed right. Since the coordinates of the avatar Av do not change, the sum of the lengths of the line segments and the coordinate values stored in the writable data area 37c of the memory 37 at that time is retained. The CPU 31 overwrites and stores "4" in the writable data area 37c of the memory 37 as the numerical value indicating the number of commands included in the programming command.

In accordance with the command "Move (10)" in the fifth line, a line segment connecting two coordinate points (20, 60) and (30, 60) is at least further another part (third locus Lc in FIG. 10B) of the locus of the avatar Av obtained in accordance with the programming command. As information specifying this line segment, the CPU 31 calculates the numerical expression "y=60" and the numerical range "20≤x≤30". Furthermore, the CPU 31 calculates the sum "90" of the lengths of the locus by adding the length "10" of the line segment calculated this time to the value "80" stored in the writable data area 37c of the memory 37 at that time, and overwrites and stores the calculated sum in the writable data area 37c of the memory 37. In addition, the CPU 31 overwrites and stores "5" in the writable data area 37c of the memory 37 as the numerical value indicating the number of commands included in the programming command.

As described above, the execution of all the commands included in the programming command illustrated in FIG. 10A is completed. When the execution of all the commands included in the programming command is completed (step S105: Yes), the CPU 31 acquires, from the writable data area 37c of the memory 37, the coordinate value (30, 60) of the avatar Av at that time and the length (third determination information) "90" of the entire locus (step S106).

When the execution of all the commands included in the programming command is completed, the CPU 31 further executes the correct/incorrect determination processing of the programming command based on each data stored in the writable data area 37c of the memory 37 in each processing described above. That is, it is determined whether the coordinates of the arrival point C of the avatar Av specified by each processing described above match with the coordinates of the point B, and information (first determination information) indicating the determination result is acquired. In addition, it is determined whether each of one or more line segments included in the locus of the avatar Av specified by each processing described above intersects with each region regarded as the obstacles a and b, and information (second determination information) indicating the determination result is acquired. When the execution of all the commands included in the programming command could not be completed, or when it was determined that some error has occurred during execution of a logging command (step S107: Yes), the programming command is classified into (2-4) "other" (step S110) and is further classified into the (2) "incorrect answer" (step S113).

In the programming command illustrated in FIG. 10A, the execution of all the commands included in the programming command is executed and it is determined that no error occurred during the execution of the programming command (step S107: No), and further, it is determined whether the specified coordinates (30, 60) of the arrival point C match with the coordinates (30, 60) of the point B (step S108). When it is determined that the two coordinates match with each other (step S108: Yes), the CPU 31 stores the information (first determination information) indicating the determination result in the writable data area 37c of the memory 37.

Furthermore, the CPU 31 determines whether the first locus La that is at least a part of the locus of the avatar Av specified by each processing described above intersects with the region regarded as the obstacle a (rectangular region surrounded by four coordinate points (0, 40), (10, 40), (10, 50), and (0, 50)) or the region regarded as the obstacle b (rectangular region surrounded by four coordinate points (25, 5), (30, 5), (30, 25), and (25, 25)) (step S109). In this determination, any known method for determining the presence or absence of intersection between a specific planar region and a line segment may be used.

The method for determining the presence or absence of intersection is not limited to this example. For example, like the information specifying the loca La, Lb, and Lc described above, the CPU 31 calculates the numerical expression and the numerical range representing the straight line specifying each line segment as information specifying four line segments which are four sides of the rectangular region regarded as the obstacle a. When the straight line specifying each line segment and the straight line specifying the first locus La have a solution within each calculated numerical range, it is determined that the first locus La intersects with the rectangular region regarded as the obstacle a. In addition, when the straight line specifying each line segment and the straight line specifying the first locus La have no solution within each calculated numerical range, it is determined that the first locus La does not intersect with the rectangular region regarded as the obstacle a. Furthermore, when it is determined that all the trajectories included in the locus of the avatar Av (the first to third loca La to Lc in the example of FIG. 10) do not intersect with the rectangular region regarded as the obstacle a, it is determined that the locus does not intersect with the obstacle a, and the information (second determination information) indicating the determination result is stored in the writable data area 37c of the memory 37.

On the other hand, when it is determined that all the loca included in the locus of the avatar Av (all the first to third loca La to Lc in the example of FIG. 10) intersect with the rectangular region regarded as the obstacle a, it is determined that the locus intersects with the obstacle a, and the information (second determination information) indicating the determination result is stored in the writable data area 37c of the memory 37. Although the obstacle a has been described above, the same determining method is used for the obstacle b. When it is determined that the locus of the avatar Av intersects with one of the obstacles a and b, the second determination information also includes information indicating which obstacle the locus of the avatar Av intersects with.

Next, the CPU 31 determines whether the programming command to be determined is a correct answer to one preset question, based on the first determination information and the second determination information. In the programming commands illustrated in FIG. 10A, since the first determination information is "match" (step S108: Yes) and the second determination information is "not intersect" (step S109: No), the CPU 31 determines that the programming command is (1) the "correct answer" (step S114) and stores information (correct/incorrect determination information) indicating the determination result in the writable data area 37c of the memory 37.

The same processing as described above is also performed on each programming command illustrated in FIGS. 11A to 14A (step S115: No, step S102). The CPU 31 calculates the length of the entire locus, which is calculated in accordance with the programming command illustrated in FIG. 11A, as "90" and the number of commands included in the programming command as "5", and stores each numerical value in the writable data area 37c of the memory 37. In addition, in the programming commands illustrated in FIG. 11A, since the first determination information indicates "not match" (step S108: No), the CPU 31 determines that the programming command is (2-3) "the arrival point is not the point B" (step S111) and (2) the "incorrect answer" (step S113), and stores information indicating the determination result in the writable data area 37c of the memory 37.

The CPU 31 calculates the length of the entire locus, which is calculated in accordance with the programming command illustrated in FIG. 12A, as "90" and the number of commands included in the programming command as "8", and stores each numerical value in the writable data area 37c of the memory 37. In addition, in the programming commands illustrated in FIG. 12A, since the first determination information is "match" (step S108: Yes) and the second determination information is "not intersect" (step S109: No), the CPU 31 determines that the programming command is (1) the "correct answer" (step S114) and stores information indicating the determination result in the writable data area 37c of the memory 37.

The CPU 31 calculates the length of the entire locus, which is calculated in accordance with the programming command illustrated in FIG. 13A, as "90" and the number of commands included in the programming command as "3", and stores each numerical value in the writable data area 37c of the memory 37. In addition, in the programming commands illustrated in FIG. 13A, since the first determination information is "match" (step S108: Yes) and the second determination information is "intersect with the obstacle b" (step S109: Yes), the CPU 31 determines that the programming command is (2-2) "arrive if the obstacle b does not exist" (step S112) and is (2) the "incorrect answer" (step S113), and stores information indicating the determination result in the writable data area 37c of the memory 37.

The CPU 31 calculates the length of the entire locus, which is calculated in accordance with the programming command illustrated in FIG. 14A, as "$30\sqrt{5}$" and the number of commands included in the programming command as "2", and stores each numerical value in the writable data area 37c of the memory 37. In addition, in the programming commands illustrated in FIG. 14A, since the first determination information is "match" (step S108: Yes) and the second determination information is "not intersect" (step S109: No), the CPU 31 determines that the programming command is (1) the "correct answer" (step S114) and stores information indicating the determination result in the writable data area 37c of the memory 37.

When it is determined that the execution of all the plurality of acquired programming commands has been completed (step S115: Yes), the CPU 31 performs comparison processing on each programming command to compare all the plurality of acquired programming commands with each other (step S116 to step S122) based on the correct/incorrect determination information and the third determination information. The CPU 31 specifies the programming command whose length (moving distance) of the entire locus calculated in accordance with each programming command is the shortest and the programming command whose number of commands included in the programming command is the smallest with respect to the programming command indicating the correct/incorrect determination information is the "correct answer" among the plurality of programming commands to be determined, and stores information indicating the specifying result in the writable data area 37c of the memory 37 in association with the corresponding programming command.

The CPU 31 compares the number of commands included in the respective programming commands in FIG. 10A, FIG. 12A, and FIG. 14A in which the correct/incorrect determination information indicates the "correct answer", and determines that the length of the entire locus by the programming command in FIG. 14A is the shortest "$30\sqrt{5}$" (step S117: Yes, step S118). The CPU 31 compares the number of commands included in the respective programming commands in FIG. 10A, FIG. 12A, and FIG. 14A in which the correct/incorrect determination information indicates the "correct answer", and determines that the programming commands of FIG. 14A includes only the fewest "two" commands among them (step S119: Yes, step S120).

The CPU 31 further adds identification information indicating "best answer" to the programming commands classified as both (1-1) and (1-2) among the plurality of programming commands to be determined, and stores it in the writable data area 37c of the memory 37. Among the plurality of programming commands to be determined, when there are only programming commands classified as (1-1) and there are no programming commands classified as (1-2), or when there are only programming commands classified as (1-2) and there are no programming commands classified as (1-1), the CPU 31 further adds identification information indicating "best answer" to the corresponding programming commands, and stores it in the writable data area 37c of the memory 37.

The CPU 31 performs the above-described processing in accordance with the classification program 37a to classify the programming commands illustrated in FIG. 10A into (1) "correct answer" and (1-3) "others" (step S121).

Similarly, the programming commands illustrated in FIG. 11A are classified into (2) the "incorrect answer" and (2-3) "the arrival point is not the point B". The programming commands illustrated in FIG. 12A are classified into (1) the "correct answer" and (1-3) "others". The programming commands illustrated in FIG. 13A are classified into (2) the "Incorrect answer" and (2-3) "arrive if the obstacle b does not exist". The programming commands illustrated in FIG. 14A are classified into (1) "correct answer", (1-1) "shortest moving distance", (1-2) "minimum number of commands", and "best answer".

The display program 37b adds supplementary information as appropriate to the results classified by the classification program 37a, or uses colors, for example, in response to a request from a user (teacher) via the key input unit 36, and displays it from the display 35 (step S122).

Figure 15:
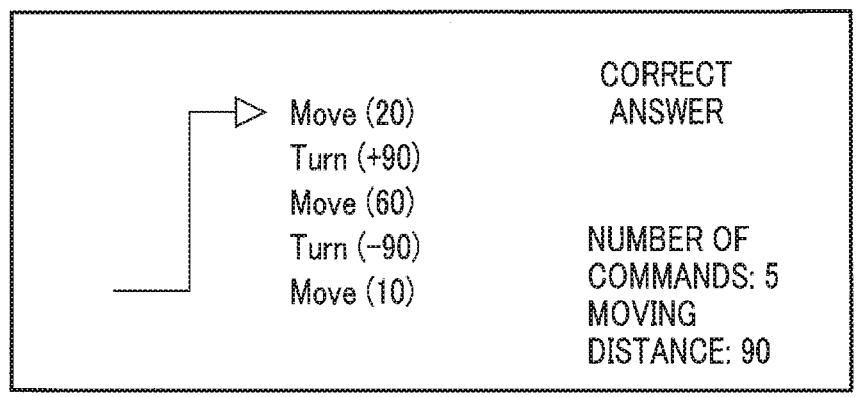
FIG. 15 is a diagram illustrating a display example (corresponding to programming commands in FIG. 10) by a display program.
Figure 16:
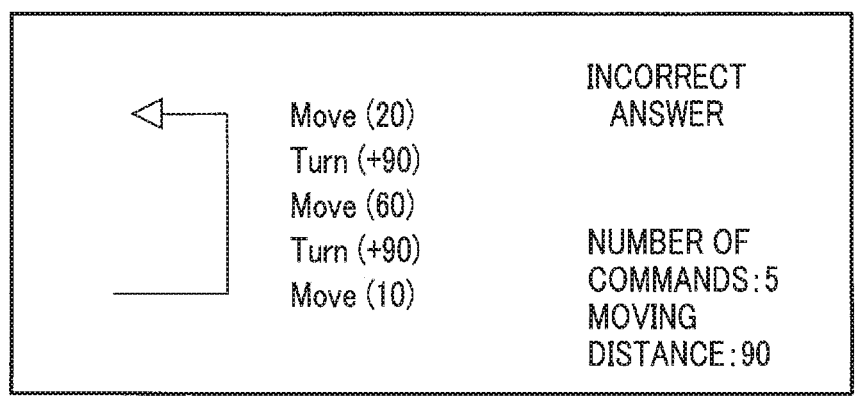
FIG. 16 is a diagram illustrating a display example (corresponding to programming commands in FIG. 11) by a display program.
Figure 17:
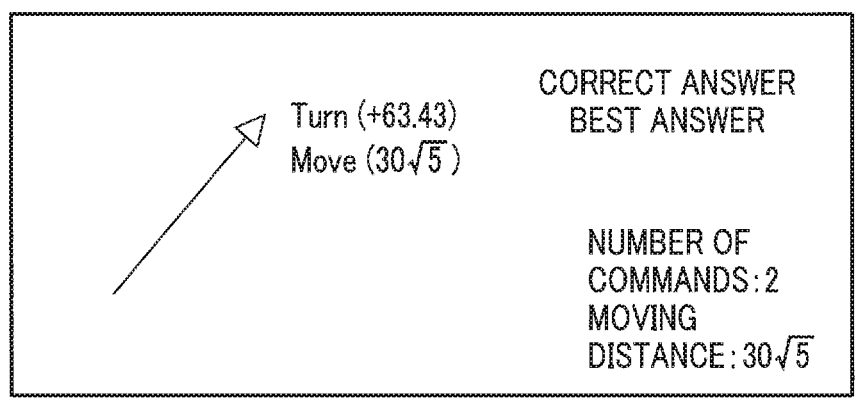
FIG. 17 is a diagram illustrating a display example (corresponding to programming commands in FIG. 14) by a display program.

Display examples by the display program 37b are illustrated in FIGS. 15 to 17.

FIG. 15 is an example in which the correct answer display, the number of commands included in the programming commands illustrated in FIG. 10A, and the length of the entire locus by the programming command are displayed together as supplementary information, in addition to the programming commands illustrated in FIG. 10A and classified as (1) "correct answer" and (1-3) "others" and the corresponding route locus illustrated in FIG. 10B. Instead of the correct answer display, or in addition to the correct answer display, a predetermined display form indicating the correct answer, for example, a route locus may be displayed in, for example, a blue color.

FIG. 16 is an example in which the incorrect answer display, the number of commands included in the programming commands illustrated in FIG. 11A, and the length of the entire locus by the programming command are displayed together as supplementary information, in addition to the programming commands illustrated in FIG. 11A and classified as (2) "incorrect answer" and (2-3) "arrival point is not the point B" and the corresponding route locus illustrated in FIG. 11B. Instead of the incorrect answer display, or in addition to the incorrect answer display, the route locus may be displayed in, for example, a red color in a predetermined display form indicating the incorrect answer.

FIG. 17 is an example in which, in addition to the correct answer display, the number of commands, and the length of the entire locus, displays that the programming command is (1-1) shortest moving distance and (1-2) and is the best answer that can be realized with the minimum number of commands, as supplementary information, in addition to (1) "correct answer", (1-1) "shortest moving distance", the programming command illustrated in FIG. 14A and classified as (1-2) "minimum number of commands", and the corresponding route locus illustrated in FIG. 14B. Instead of the "best answer" display, or in addition to the "best answer" display, a predetermined display form and route locus for indicating the "best answer" may be displayed in, for example, a thick blue color, and may be displayed by a method of blinking and displaying only for a few seconds immediately after the start of the display.

Even if the route loca are the same as each other, the contents of the programming command may be different from each other. In such a case, the programming commands having the same route locus are simultaneously displayed from the display 35, and the different points may be emphasized by, for example, displaying different portions in different colors in both programming commands.

Next, the operation of the electronic apparatus 3 to which the classification method according to the embodiment of the present invention configured as described above is applied will be described.

Here, it is assumed that, in the programming class, the teacher instructs the student to create the route drawing programming command to move the avatar Av while avoiding the obstacles a and b serving the obstacles from the point A to the point B as illustrated in FIG. 7, the operation on the student side, that is, the graph function electronic calculator 4 side will be described with reference to a flowchart illustrated in FIG. 18.

In response to the command from the teacher as described above, the student creates the programming command by inputting a command from the key input unit 11 of the graph function electronic calculator 4 (step S1).

When the student creates the programming command, the student can display the result of the route drawing realized by the programming command from the display 12 by using the function of the drawing program 22a of the graph function electronic calculator 4 (step S2). When the avatar Av moves to the outside of the coordinate range preset in the coordinate system drawn on the screen of the display 12 of the graph function electronic calculator 4, the coordinate range to be drawn on the screen of the display 12 may be appropriately scrolled so that the coordinate range is set to include the latest coordinate value of the avatar Av obtained based on the programming command.

As described above, the student completes the programming command while referring to the result of the route drawing displayed from the display 12. After that, the student operates the key input unit 11 of the graph function electronic calculator 4 and inputs the command to transmit the programming command to the teacher's electronic apparatus 3 (step S3). In response to this command, the CPU 21 causes the communication unit 25 to transmit the programming command created by the student and the information indicating the coordinates of the arrival point C to the electronic apparatus 3 via the communication network 2 in accordance with the drawing program 22a (Step S4).

Figure 19:
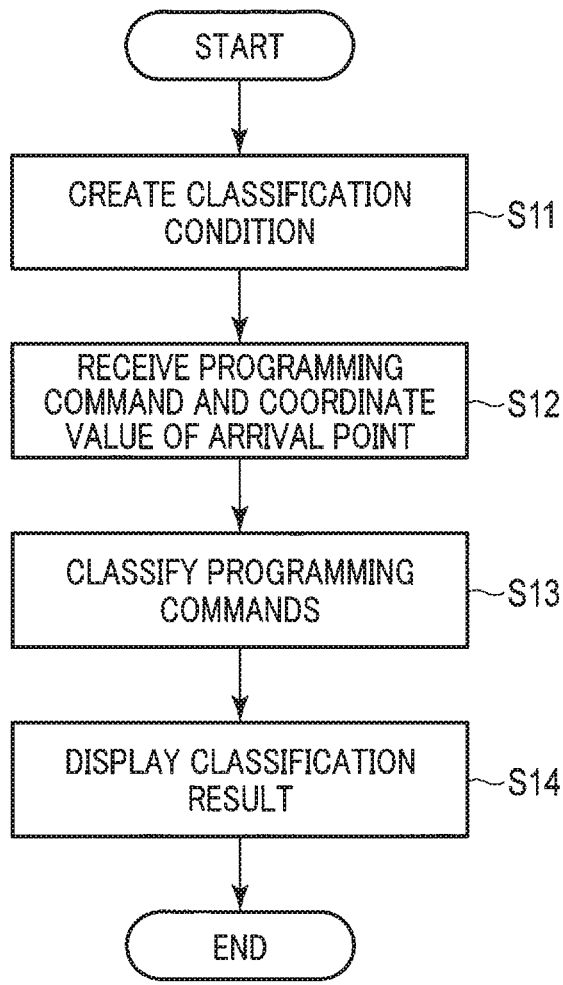
FIG. 19 is a flowchart illustrating an operation example on the electronic apparatus side.

Next, the operation on the teacher side, that is, the electronic apparatus 3 side will be described with reference to a flowchart illustrated in FIG. 19.

The teacher operates the key input unit 36 of the electronic apparatus 3 and inputs map information as illustrated in FIG. 7 as one preset question. Specifically, the map information is specified by coordinate values of the points A and B and a plurality of coordinate values (four coordinate values specifying four vertices of each rectangular region) specifying the obstacle a and the obstacle b. After inputting the map information as illustrated in FIG. 7, the teacher instructs verbally to create the programming command to move the avatar Av while avoiding the obstacles a and b serving as the obstacles from the point A to the point B included in the map information.

As illustrated in FIG. 8, (1) in addition to "correct answer" and (2) "incorrect answer", the classification condition for classifying answers to such programming tasks is (1-1) "minimum moving distance", (1-2) "minimum number of commands", and (1-3) "others" as subdivision condition of each programming command classified as (1) "correct answer", and (2-1) "arrive if the obstacle a does not exist", (2-2) "arrive if the obstacle b does not exist", (2-3) "the arrival point is not the point B", and (2-4) "others" as subdivision condition of each program command classified as (2) "incorrect answer". The teacher operates the key input unit 36 of the electronic apparatus 3, selects and specifies one of the classification and the subdivision actually used in the programming class among these classification conditions, and creates the classification condition. The CPU 31 stores the created classification condition in the classification condition storage 38 (step S11). In the following, in step S11 described above, it is assumed that the above-described classifications (that is, (1) "correct answer" and (2) "incorrect answer") and subdivision (that is, (1-1) "minimum moving distance", (1-2) "minimum number of commands", (1-3) "others", (2-1) "arrive if the obstacle a does not exist", (2-2) "arrive if the obstacle b does not exist", (2-3) "the arrival point is not the point B", and (2-4) "others") are selected, specified, and set as the classification condition.

In step S4, the programming command transmitted from the graph function electronic calculator 4 and the coordinate value of the arrival point C are received by the communication unit 32 (step S12).

The programming command received by the communication unit 32 is classified by the classification program 37a based on the classification condition stored in the classification condition storage 38 (step S13). In step S13, the processing performed by the CPU 31 in accordance with the classification program 37a is the same as described above.

The result classified by the classification program 37a is displayed from the display 35 while displaying the route locus in different colors, so as to be able to distinguish between correct and incorrect answers along with supplementary information such as the correct or incorrect answer, the number of commands, and the moving distance, for example, in response to a request from a user (teacher) via the key input unit 36, by the display program 37b, for example, as illustrated in FIGS. 15 to 17 (step S14).

As described above, the electronic apparatus 3 can automatically classify the programming commands transmitted from each student in accordance with the classification condition designated by the teacher. Furthermore, the classified programming commands can be displayed from the display 35 along with supplemental information.

Therefore, since the programming commands transmitted from each student are released from the necessity of directly classifying them, the teacher can make better use of the limited class time.

By referring to the information displayed from the display 35, the teacher can not only immediately grasp the correct or incorrect answer of the programming command transmitted from each student, but also grasp the contents of the correct answer and incorrect answer at a glance. Furthermore, it is possible to grasp instantly which answer is the best answer.

Therefore, the teacher can immediately grasp the student's comprehension level and accordingly can make a more accurate explanation to the student.

As described above, in the electronic apparatus 3 to which the classification method according to the embodiment of the present invention is applied, it is possible to automatically classify the plurality of programming commands transmitted from the graph function electronic calculator 4 in accordance with the contents. Therefore, it is possible to reduce the burden on the teacher and contribute to improving the efficiency of the lesson.

In particular, the function of automatically classifying various answers, which is realized by the electronic apparatus 3 to which the classification method according to the embodiment of the present invention is applied, is particularly useful for application to learning of algorithms in which the correct answer is not always one, and thus, the teacher can not only grasp the degree of comprehension of each student, but also easily find errors that many students are likely to fall into. Moreover, it also greatly contribute to planning appropriate teaching methods based on it.

(Modification)

Figure 20:
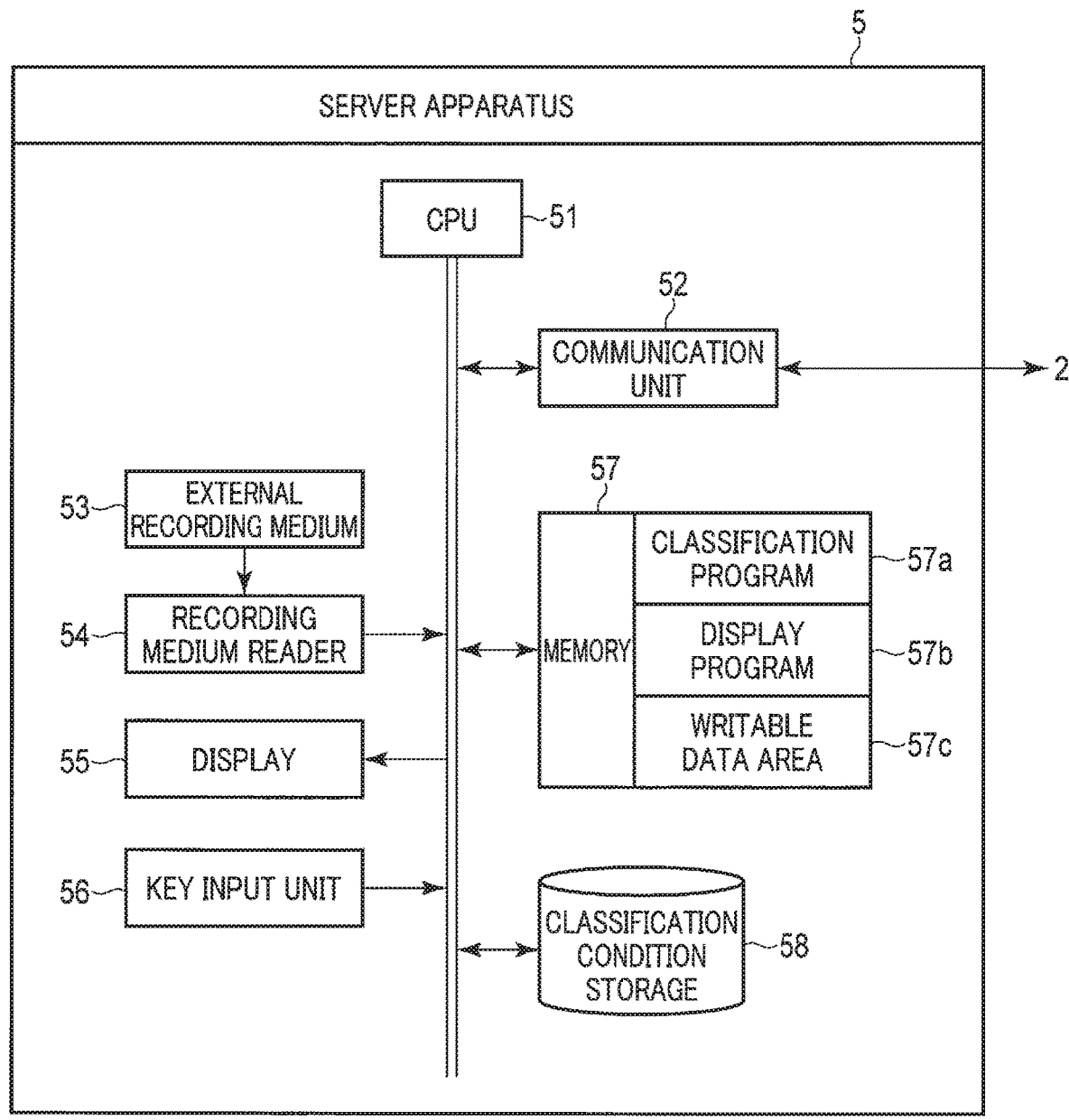
FIG. 20 is a block diagram illustrating a configuration example of an electronic circuit of a server apparatus.
Figure 21:
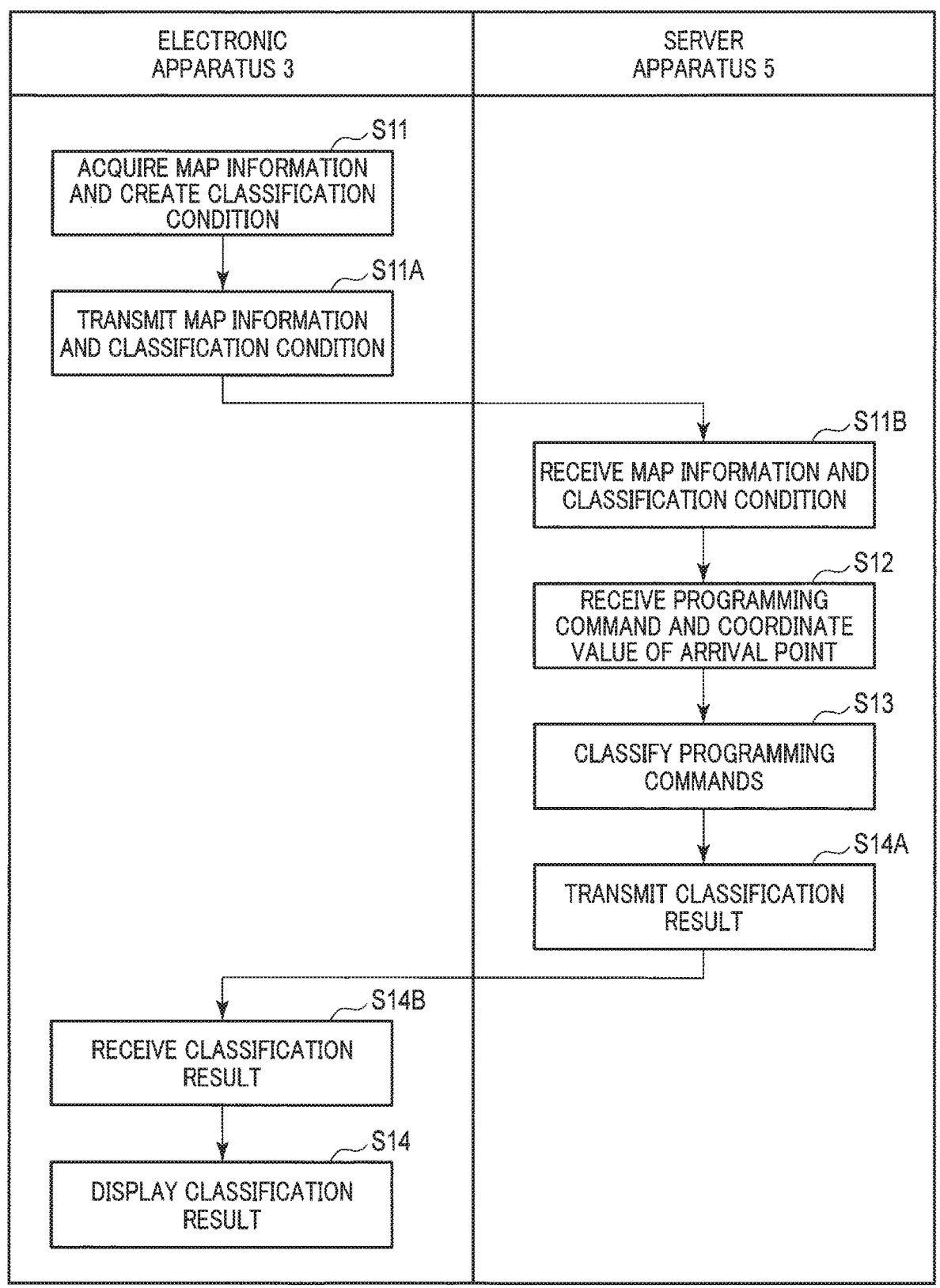
FIG. 21 is a flowchart illustrating an operation example of an electronic apparatus and a server apparatus.

In the above embodiment, a part of the processing among the processing described as being performed by the CPU 31 of the electronic apparatus 3 may be configured to be performed by a CPU 51 of a server apparatus 5 installed in the communication network 2 so as to communicate with the electronic apparatus 3 and the graph function electronic calculators 4 (#1 to #n). The modification configured as described above will be described below. FIG. 20 is a block diagram illustrating a configuration example of an electronic circuit of the server apparatus 5. Among the respective parts of the server apparatus 5, those that function similarly to the corresponding parts of the electronic apparatus 3 will be omitted as appropriate. FIG. 21 is a flowchart illustrating the operation example of the electronic apparatus and the server apparatus. Processing steps similar to those in FIG. 19 are denoted by the same reference numerals as in FIG. 21.

In this modification, the teacher operates the key input unit 36 of the electronic apparatus 3 to create the classification condition (step S11), and then the created classification condition is transmitted to the server apparatus 5 via the communication network 2 (step S11A). The server apparatus 5 acquires the classification condition transmitted from the electronic apparatus 3 via the communication network 2, and stores the acquired classification condition in the classification condition storage 58 (step S11B). The communication unit 52 of the server apparatus 5 receives the programming command transmitted from the graph function electronic calculator 4 and the coordinate value of the arrival point C in step S4 (step S12). The programming command received by the communication unit 52 of the server apparatus 5 is classified by the classification program 57a based on the classification condition stored in the classification condition storage 58 (step S13). The result classified by the classification program 57a is transmitted to the electronic apparatus 3 via the communication network 2 (step S14A).

The electronic apparatus 3 acquires the classification condition transmitted from the server apparatus 5 via the communication network 2, and stores the acquired classification condition in the classification condition storage 38 (step S14B). The result classified by the classification program 57a of the server apparatus 5 is displayed from the display 35 in response to a request from a user (teacher) via, for example, the key input unit 36 of the electronic apparatus 3 by the display program 37b as illustrated in, for example, FIGS. 15 to 17 (step S14).

As in the above-described modification, if a part of the processing including at least step S13 is performed in the server apparatus 5, the electronic apparatus 3 may include at least the CPU 31, the communication unit 32, the display 35, the key input unit 36, and the like. Therefore, even if the teacher owns only apparatuses that do not have special configurations such as the classification program 37a or the classification condition storage 38, the teacher can grasp the classification result of the programming command created by the student by using the graph function electronic calculator 4 displayed on the display 35.

In the above-described embodiment and modification, of the processing described as being performed by the CPU 31 of the electronic apparatus 3 and the CPU 51 of the server apparatus 5, the processing (step S13) for classifying the programming commands may be performed by the CPU 41 of the graph function electronic calculator 4.

In addition, in the above-described embodiment and modification, the graph function electronic calculator 4 has been described as including the communication unit 25, but the communication unit 25 may not necessarily be provided. In this case, the drawing program 22a creates a QR code (registered trademark) that codes the programming command, and displays the created QR code from the display 12. Then, the programming command is acquired by reading the displayed QR code with the camera function of the two-dimensional code reader 6 such as the smartphone or the tablet terminal, and the smart phone or the tablet terminal transmits the acquired programming command to the electronic apparatus 3 or the server apparatus 5 via the communication network 2, thereby replacing the function of the communication unit 25. In addition, when the electronic apparatus 3 has the camera function, the electronic apparatus 3 directly reads the displayed QR code with its camera function. Thus, the electronic apparatus 3 can acquire the programming command from the graph function electronic calculator 4 without passing through the communication network 2.

Furthermore, in the above-described embodiment, in step S11, only a part of the classifications (not limited to this example, but only (1) "correct answer", (2) "incorrect answer", (1-1) "shortest moving distance", (1-2) "minimum number of commands", and (1-3) "others") may be selected, specified, and set as the classification condition. In that case, when each programming is the "incorrect answer", no subdivision need be performed.

In addition, in the above-based embodiment, the classification processing may be performed based on only one of the coordinates of the arrival point and whether the locus intersects with the obstacle. In this case, one preset question may be, for example, the following. The students can freely set the coordinates of the start point and the coordinates of the goal point, but when the locus does not intersect with the obstacles a and b included in the map information, it can be regarded as the correct answer. Alternatively, when the map information does not include information on the obstacles, but only information on the coordinates of the start point and the goal point is included and the start point and the goal point match with each other, it can be regarded as the correct answer.

The present invention is not limited to each embodiment, but various modifications are possible in implementation thereof within the range not departing from the gist thereof. In addition, each embodiment includes inventions of various stages, and various inventions can be extracted by proper combinations of a plurality of disclosed constituent elements. For example, even when some constituent elements are deleted from the constituent elements illustrated in each embodiment or some constituent elements are used in combination in various forms, the structure in which the constituent elements are deleted or used in combination may be extracted as an invention, when the problem stated in the problem to be solved is solved and the effect stated in the effects of the invention is obtained.

What is claimed is:

1. An electronic apparatus, comprising a processor and a storage storing instructions that, when executed by the processor, control the processor to:
    acquire a text-based programming command list including one or more text-based programming commands;
    sequentially execute in order each of the one or more text-based programming commands of the acquired text-based programming command list to thereby obtain at least one of a position and a locus in a coordinate system set on a screen of a display;
    determine at least one of (i) whether the obtained position in the coordinate system matches with a predetermined position in the coordinate system associated with a preset question, to thereby obtain first determination information indicating whether the obtained position in the coordinate system matches with the predetermined position in the coordinate system associated with the preset question and (ii) whether the obtained locus in the coordinate system intersects with a predetermined region in the coordinate system associated with the preset question, to thereby obtain second determination information indicating whether the obtained locus in the coordinate system intersects with the predetermined region in the coordinate system associated with the preset question;
    determine whether the text-based programming command list is correct with respect to the preset question based on at least one of the first determination information and the second determination information, to thereby obtain correct/incorrect determination information indicating whether the text-based programming command list is correct with respect to the preset question; and
    output, from the display, at least any of the first determination information, the second determination information, and the correct/incorrect determination information.

2. The electronic apparatus according to claim 1,
    wherein the processor is configured to:
    in acquiring the text-based programming command list, acquire a plurality of text-based programming command lists from a plurality of external terminals, respectively, and
    output, from the display, information on each of the text-based programming command lists so as to be distinguishable for each of the external terminals that respectively output the plurality of text-based programming command lists, the information on each of the text-based programming command lists including at least any of the obtained first determination information, the obtained second determination information, and the correct/incorrect determination information for that text-based programming command list.

3. The electronic apparatus according to claim 2,
    wherein the processor is configured to:

determine (i) superiority/inferiority of each of the text-based programming command lists among the text-based programming command lists based on a number of the one or more text-based programming commands included in each of the text-based programming command lists, (ii) third determination information that is at least one of lengths of the locus in the coordinate system determined for each text-based programming command list, and (iii) the correct/incorrect determination information of each of the text-based programming command lists; and output information indicating the superiority/inferiority of each of the text-based programming command lists from the display so as to be distinguishable for each of the external terminals that output the respective text-based programming command lists, together with the information on each of the text-based programming command lists.

4. The electronic apparatus according to claim 3, wherein the processor is configured to:

output, from the display, all of the one or more text-based programming commands included in each of the text-based programming command lists, the locus in the coordinate system determined for each of the text-based programming command lists, the number of text-based programming commands included in each of the text-based programming command lists, at least any of the lengths of the locus in the coordinate system determined for each of the text-based programming command lists, together with any of the information on each of the text-based programming command lists, so as to be distinguishable for each of the external terminals that output the text-based programming command lists.

5. The electronic apparatus according claim 2, wherein the processor is configured to:

cause an imaging apparatus of the electronic apparatus to read each two-dimensional code displayed on each display of the external terminals, and decode the read two-dimensional codes to acquire the text-based programming command lists from the external terminals.

6. A non-transitory recording medium having a program recorded thereon that is executable by a processor of an electronic apparatus including the processor and a storage, the program being executable by the processor to control the processor to perform functions comprising:

acquiring a text-based programming command list including one or more text-based programming commands;

sequentially executing in order each of the one or more text-based programming commands of the acquired text-based programming command list to thereby obtain at least one of a position and a locus in a coordinate system set on a screen of a display;

determining at least one of (i) whether the obtained position in the determined coordinate system matches with a predetermined position in the coordinate system associated with a preset question, to thereby obtain first determination information indicating whether the obtained position in the coordinate system matches with the predetermined position in the coordinate system associated with the preset question and (ii) whether the obtained locus in the coordinate system intersects with a predetermined region in the coordinate system associated with the preset question, to thereby obtain second determination information indicating whether the obtained locus in the coordinate system intersects with the predetermined region in the coordinate system associated with the preset question;

determining whether the text-based programming command list is correct with respect to the preset question based on at least one of the first determination information and the second determination information, to thereby obtain correct/incorrect determination information indicating whether the text-based programming command list is correct with respect to the preset question; and outputting, from the display, at least any of the first determination information, the second determination information, and the correct/incorrect determination information.

7. The electronic apparatus according to claim 1, wherein each of the one or more text-based programming commands includes text specifying at least one of (i) an amount of movement by which an avatar is to be moved in the coordinate system at a time of execution of the text-based programming command, (ii) coordinates to which the avatar is to be moved in the coordinate display system at the time of execution of the text-based programming command, and (iii) a change in direction in which the avatar is to be moved in the coordinate system while maintaining current coordinates of the avatar at the time of execution of the text-based programming command.

* * * * *

UNITED STATES PATENT AND TRADEMARK OFFICE
CERTIFICATE OF CORRECTION

| | | |
|---|---|---|
| PATENT NO. | : 11,276,318 B2 | |
| APPLICATION NO. | : 16/355609 | |
| DATED | : March 15, 2022 | |
| INVENTOR(S) | : Toshiaki Tanaka | |

It is certified that error appears in the above-identified patent and that said Letters Patent is hereby corrected as shown below:

In the Claims

Column 21, Line 36 (Claim 5), after "according", insert --to--.

Signed and Sealed this
Nineteenth Day of July, 2022

Katherine Kelly Vidal
*Director of the United States Patent and Trademark Office*